United States Patent [19]

Todd

[11] E Patent Number: Re. 31,622

[45] Reissued Date of Patent: Jul. 3, 1984

[54] MINING MACHINE HAVING RECTANGULAR THRUST TRANSMITTING CONVEYOR COLUMN

[75] Inventor: Robert E. Todd, Houston, Tex.

[73] Assignee: Rijn-Schelde-Verolme Machinefabrieken en Scheepswerven N.V., Rotterdam, Netherlands

[21] Appl. No.: 437,685

[22] Filed: Oct. 29, 1982

Related U.S. Patent Documents

Reissue of:

[64] Patent No.: 4,014,574
Issued: Mar. 29, 1977
Appl. No.: 566,986
Filed: Apr. 10, 1975

[51] Int. Cl.[3] ..... E21C 27/24; E21C 29/02; E21C 35/24

[52] U.S. Cl. ..... 299/1; 299/18; 299/30; 299/64; 175/61; 175/73

[58] Field of Search ..... 299/1, 18, 30, 56, 57, 299/64–68; 175/52, 62, 74–76, 91, 94, 103, 172, 122

[56] References Cited

U.S. PATENT DOCUMENTS

| | | | |
|---|---|---|---|
| 1,189,739 | 7/1916 | Rolli | 175/172 |
| 2,669,441 | 2/1954 | Castanoli et al. | 299/56 |
| 2,872,170 | 2/1959 | Alspaugh et al. | 299/30 |
| 2,946,567 | 7/1960 | Pepper | 175/122 |
| 2,948,520 | 8/1960 | Densmore | 299/56 |
| 3,307,876 | 3/1967 | Akkerman | 299/56 |
| 3,578,807 | 5/1971 | Barrett | 299/1 |
| 3,746,110 | 7/1973 | Young et al. | 175/85 |
| 3,767,836 | 10/1973 | Geis et al. | 175/62 X |
| 3,805,721 | 4/1974 | Robishaw | 114/0.5 F |
| 3,917,010 | 11/1975 | Fink | 175/73 |
| 3,951,459 | 4/1976 | Honeycutt | 299/18 X |

FOREIGN PATENT DOCUMENTS

| | | | |
|---|---|---|---|
| 474493 | 5/1927 | Fed. Rep. of Germany | 175/103 |
| 800864 | 9/1958 | United Kingdom . | |
| 234302 | 6/1969 | U.S.S.R. | 299/57 |

*Primary Examiner*—Ernest R. Purser
*Attorney, Agent, or Firm*—Wood, Herron & Evans

[57] ABSTRACT

A mining machine comprises a laterally elongated cutting head including means for cutting an earth formation, a laterally elongated thrust transmitting column connected to and extending rearwardly from the cutting head, and a power head connected to the rear of the column and operative to thrust the cutting head forward into the earth formation by means of the interposed column. The column carries a non-thrust transmitting column conveyor for carrying fragments cut from the formation from the cutting head to the power head.

41 Claims, 23 Drawing Figures

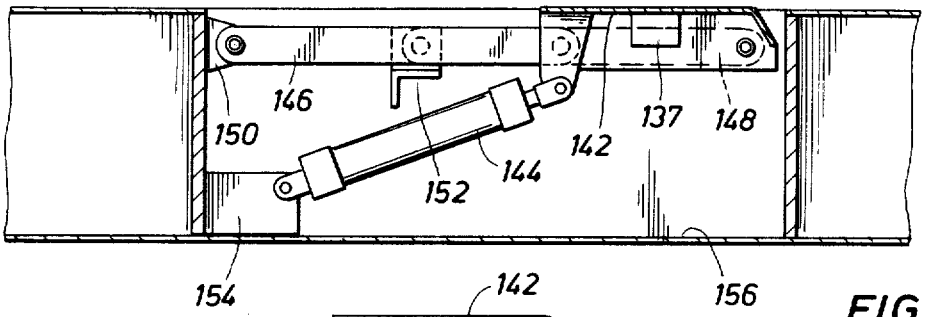
FIG. 6
FIG. 7
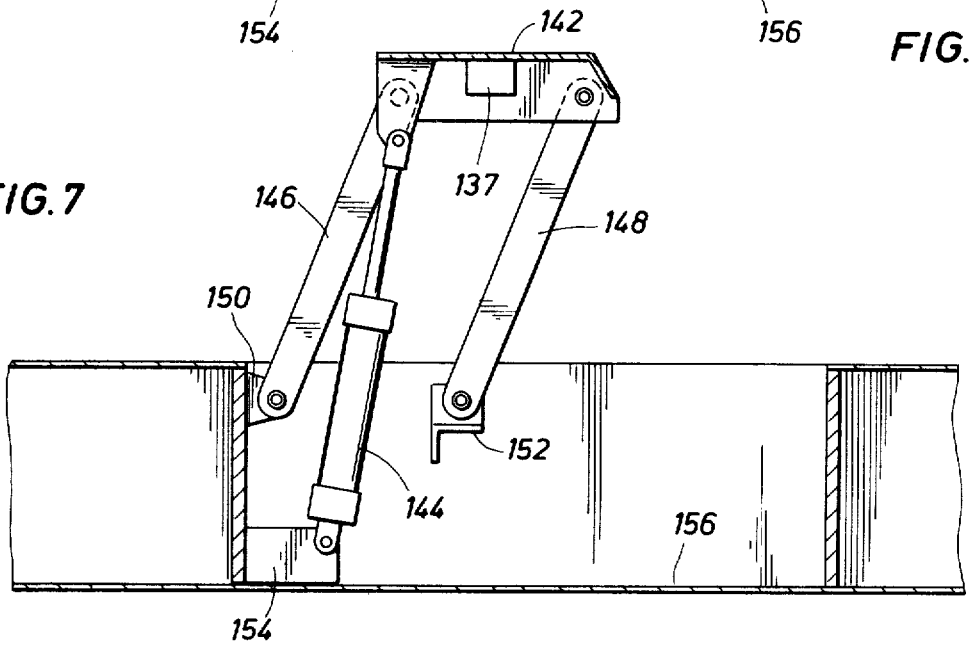
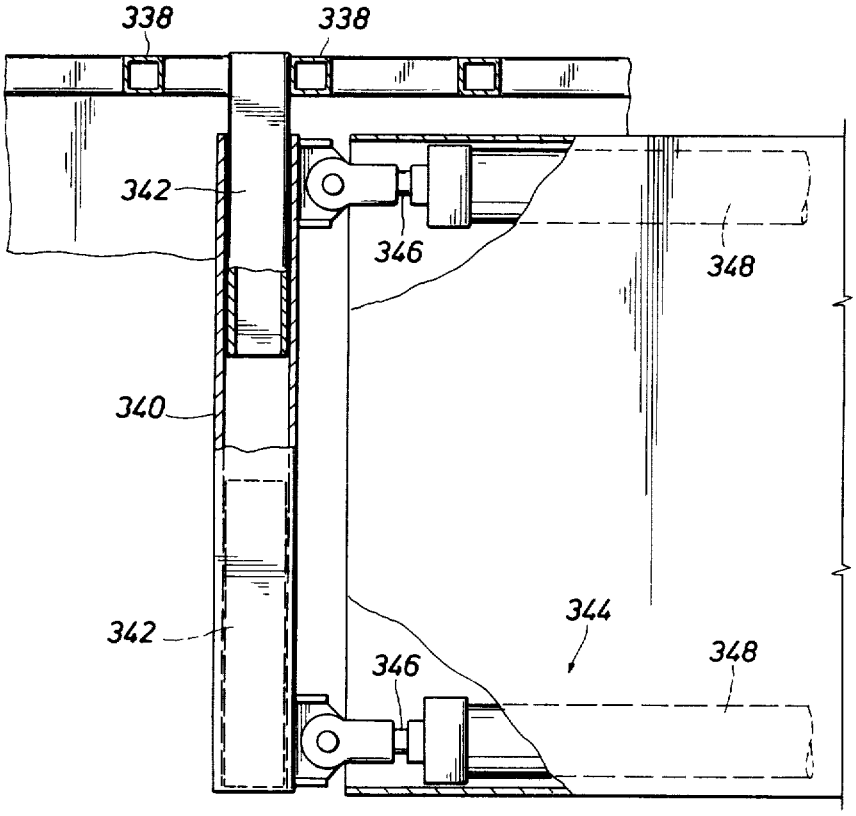
FIG. 19

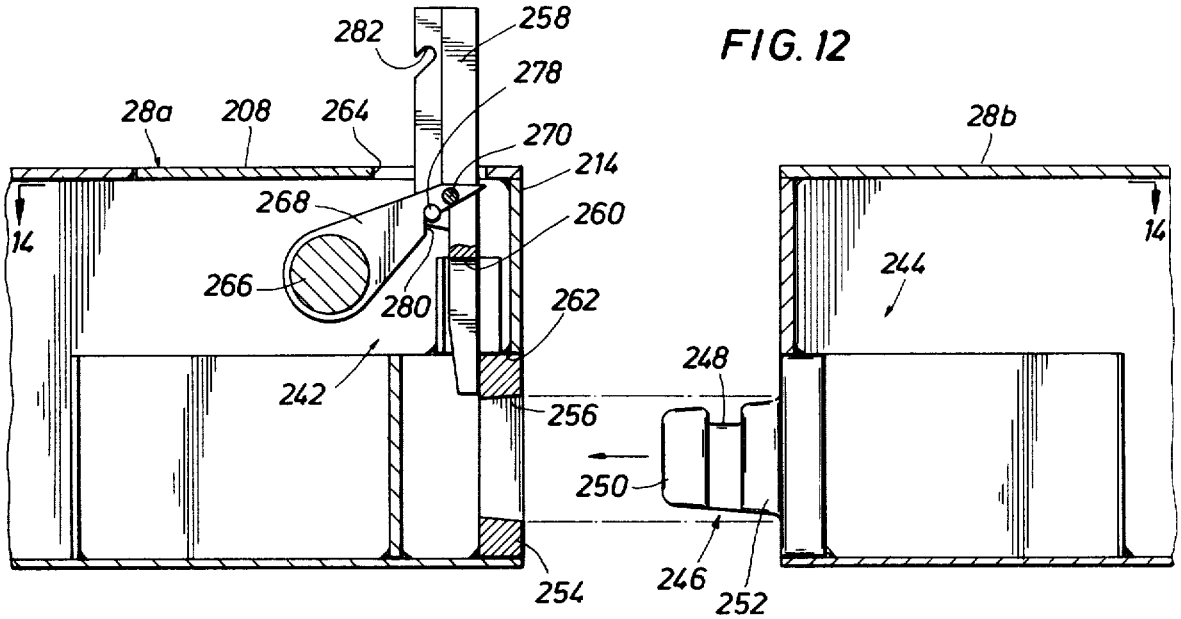
FIG. 12
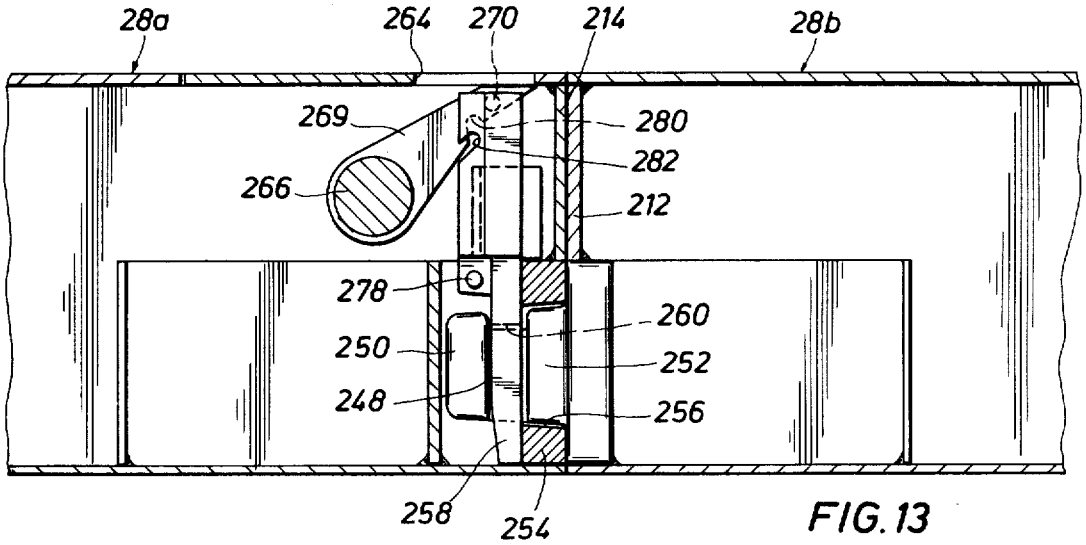
FIG. 13
FIG. 14
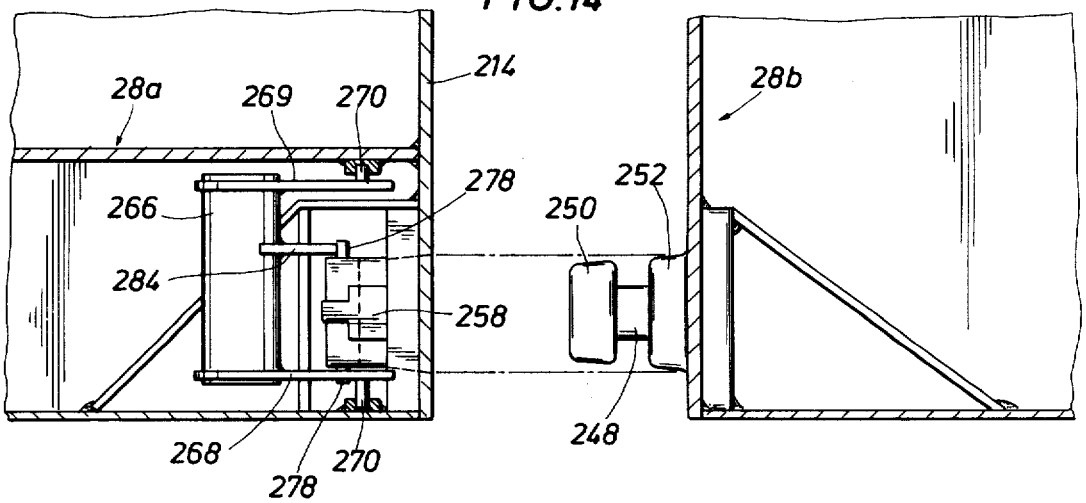

FIG. 20
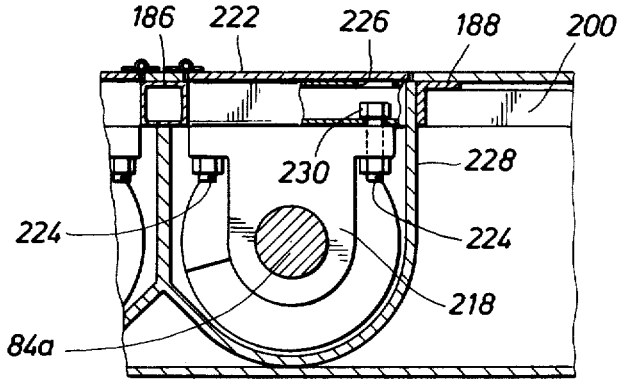
FIG. 21
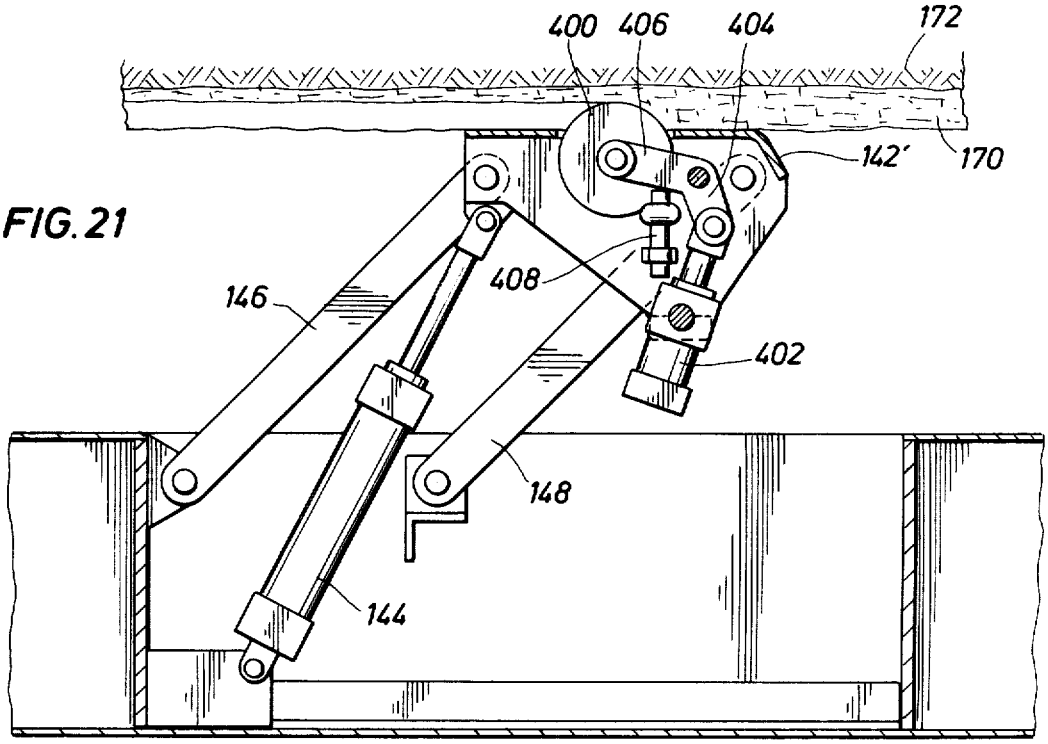
FIG. 22
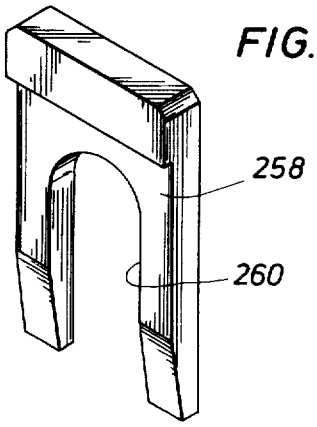
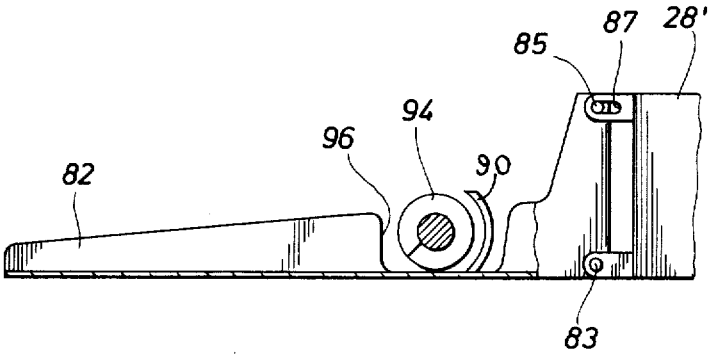
FIG. 23

MINING MACHINE HAVING RECTANGULAR THRUST TRANSMITTING CONVEYOR COLUMN

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention pertains to the extraction of minerals from the earth and is especially adapted for the mining of coal. The need for sources of energy has multiplied rapidly over the past several decades as technology has developed and society has become increasingly mechanized. At the present time almost all of our energy needs are being met by combustion of various forms of fossil fuels such as coal, natural gas, and petroleum. Our increased energy needs dictate that the means for extracting these fuels from the earth be improved and made as efficient as possible. At the same time, it is imperative that deleterious effects on the environment due to such extraction be minimized.

Coal normally is found deposited in seams or layers interspersed with layers or strata of rock, soil, or other earth formation. The best method of mining would involve removing as much coal as possible from these layers with minimal removal of the surrounding non-coal strata and minimal disturbance or defacing of the terrain in the area. It is also necessary, where coal has been removed from a seam without disturbing the surface terrain, to leave adequate supporting structure in the seam to prevent cave-ins. Often a preliminary excavation is made, either from the surface or underground, to expose a wall containing one or more seals of coal. The coal is then removed by working from the wall into the seam.

Hand mining techniques in which the miners must enter the area of the seam as it is being mined are obviously dangerous and slow. Additionally, these techniques result in a great deal of waste if the coal seam is thin since enough material must be removed to allow the miners to enter even if much of the material is non-coal earth formation.

For these reasons, attention has been directed to the development of remote control apparatus for removing coal from a seam without the need for workers entering the seam. In particular there is need for such apparatus which is adaptable for the mining of thin seams.

2. Description of the Prior Art

One approach to solving this problem involved drilling into the seam from the exposed wall with an auger type drill. In some cases the leading end of the auger was provided with cutting means so that the auger itself served only as a conveyor for the cuttings and a transmitting member for the drilling thrust and torque, see e.g. U.S. Pat. No. 2,948,520. By using an auger of sufficiently small diameter, it was possible to remove coal from a thin seam without cutting into the surrounding rock. However, the only way of adapting the machine for mining a seam of another thickness was to replace the auger by another one of different diameter or to provide radially extensible auxiliary cutters. Furthermore, the diameter of the auger and/or cutters limited the width as well as the height of the hole which could be bored. This was less than satisfactory because the coal seams are usually substantially continuous in lateral extent.

Several attempts have been made to devise a machine which could remove more coal from the seam in a single pass by drilling a hole which was wider than the height of the seam. Two such machines are shown in U.S. Pat. No. 3,746,110 and British Pat. No. 800,864. Each of these machines has a cutting head which is wider than it is high. Thrust is transmitted to the cutting head by two parallel strings of rods in the machine of the British Patent and by two or more strings of auger segments, much the same as rods, in the machine of the U.S. Patent. Both of these machines suffer from the same basic disadvantages. In an effort to better distribute the drilling thrust across the cutting head, two or more strings of rods or the like are used. However, this introduces new problems of keeping these strings aligned and the forces balanced. Even though the two strings may be tied together laterally at a relatively few spaced locations along their lengths, they still act essentially as two separate strings and this alignment and balance is difficult, if not impossible, to achieve.

Another difficulty is that the strings of rods or auger segments are flexible under the high forces necessary for drilling. They tend to buckle, whip, etc. This makes the machine generally unstable, susceptible to failure of various parts, and difficult to control and steer from a remote location outside the hole being drilled. This tendency toward whipping and the like is evidenced by the fact that the rod strings of the machine of the British Patent are provided with upstanding guides which brace the strings against the roof of the hole to combat the whipping action.

Still another problem with these two machines is that the conveyors are unprotected against any material which might fall from the roof of the hole being drilled. This can jam the conveyor and in some cases can even result in the entire machine being caught in the hole. In this situation the expensive cutting head is either lost entirely, or it must be forcefully pulled from the hole resulting in severe damage to various parts of the machinery, particularly the conveyor. In the machine of the U.S. Patent, the conveyors are subjected to even worse abuse by virtue of the fact that they are the sole means of transmitting the drilling thrust and torque to the cutting head.

SUMMARY OF THE INVENTION

The drilling machine of the present invention includes a laterally elongated cutting head including means for cutting into the coal and breaking it away in fragments. A thrust-transmitting column, also laterally elongated, is connected to the rear of the cutting head. A power head designed to be stationed outside the hole adjacent the wall is connected to the rear of the column and thrusts the cutting head forward into the formation by means of the column. The column has sufficient cross-sectional dimension and internal structural strength to transmit thrust as a column, albeit that it is disposed generally horizontally rather than vertically, without flexing, whipping, etc. Thus, it can be used not only to transmit thrust, but also to guide and control the cutting head in gross steering.

The column is preferably comprised of a plurality of column modules removably connected end-to-end. The forwardmost module is removably connected to the cutting head, and rearwardmost module is removably connected to the power head. As drilling progresses, the power head is periodically disconnected from the rear module then in place and pulled back so that a new rear module can be interposed therebetween to increase the length of the column.

A non-torque-transmitting column conveyor is carried by the column and extends along substantially its entire length. The column conveyor is preferably comprised of a plurality of conveyor segments disposed in end-to-end relation, each of the conveyor segments being carried by a respective one of said column modules. Each of the modules has a main body which preferably defines a box-like structure having a top cover. The respective conveyor segment is disposed within the box-like structure beneath the top cover for protection.

The forwardmost column module may be modified to serve as a control module for fine steering and control of the cutting head. It preferably comprises both vertical and horizontal steering means which can be operated by remote controls located outside the hole. The horizontal steering means preferably comprises a single side steering shoe selectively laterally extensible and retractable from one side of the control module. The cutting head includes means operative to cause the cutting head to bear laterally toward the side on which the side steering shoe is located. Then the front of the drilling machine can be steered in a horizontal direction by pushing against the side wall of the hole being bored with the side steering shoe to resist to varying degrees the tendency of the cutting head to bear to that side.

The machine may include means for pivoting the cutting head with respect to the control module. This provides vertical sweep to accommodate various thicknesses of coal seams. The control module is preferably provided with means for detecting the thickness of the layer of coal remaining at the top of the hole to advise the machine operator of the vertical steering and sweep needs.

As successive holes are drilled side-by-side, pillars of formation are left between the holes to support the formation above. Each new hole is located on that side of the last preceding hole which corresponds to the side of the control module on which the side steering shoe is located. Then as the new hole progresses, there should be a supporting pillar of formation on the side of the machine opposite the side steering shoe and solid unmined formation adjacent the side steering shoe. The control module may include sensor means for detecting the presence of the adjacent supporting pillar to advise the operator of the horizontal steering needs. The sensor means can also be operative to detect some factor, e.g. thickness, which is indicative of the strength of the pillar.

The power head of the machine may include a track frame and a drive assembly mounted thereon. Primary reversible drive means are provided for moving the drive assembly longitudinally along the track frame and thereby thrusting the connected column and cutting head forward or pulling them back. Auxiliary drive means may be included to provide additional force, for example, to pull the cutting head from the hole if it should become jammed or stuck.

It is thus a principle object of the present invention to provide a drilling machine comprising a laterally elongated column for transmitting thrust from a power head outside a hole being drilled to a cutting head within the hole.

Another object of the invention is to provide a mining machine having a laterally elongated thrust-transmitting column comprising a plurality of modules connected end-to-end.

A further object of the invention is to provide a mining machine having a modular thrust transmitting column which carries and protects a sectioned non-thrust-transmitting column conveyor.

Yet another object of the invention is to provide a mining machine having a modular thrust-transmitting column, a forwardmost module of which is modified to serve as a control module.

Still a further object of the invention is to provide a mining machine in which horizontal steering is accomplished by a single laterally extensible and retractable shoe and in which the cutting head in operation tends to bear toward the side of the machine on which said shoe is located.

One more object of the invention is to provide a mining machine with a power head having primary reversible drive means and auxiliary drive means.

Other objects, features, and advantages of the invention will be made apparent by the following description of a preferred embodiment, the drawings, and the claims.

BRIEF DESCRIPTION OF THE DRAWINGS

FIG. 6 is a sectional view along lines 6—6 in FIG. 4 showing one of the top control shoes and the top sensing means in retracted position.

FIG. 7 is a view similar to that of FIG. 6 showing the control shoe in extended position.

FIG. 12 is a sectional view along lines 12—12 in FIG. 8 showing the female lock assembly of the column module and also showing the male lock assembly of an adjacent module prior to connection.

FIG. 13 is a view of the apparatus of FIG. 12 in connected position.

FIG. 14 is a sectional view along lines 14—14 in FIG. 12.

FIG. 19 is a section view on lines 19—19 in FIG. 17 showing the auxiliary drive means.

FIG. 20 is a fragmentary sectional view on lines 20—20 of FIG. 9.

FIG. 21 is a fragmentary view of a portion of the apparatus of FIG. 7 showing a second embodiment of the sensor.

FIG. 22 is a fragmentary view of the locking member of the female connection assembly of FIGS. 12–14.

FIG. 23 is a partial sectional view on lines 23—23 of FIG. 2.

DESCRIPTION OF THE PREFERRED EMBODIMENT

Figure 1:
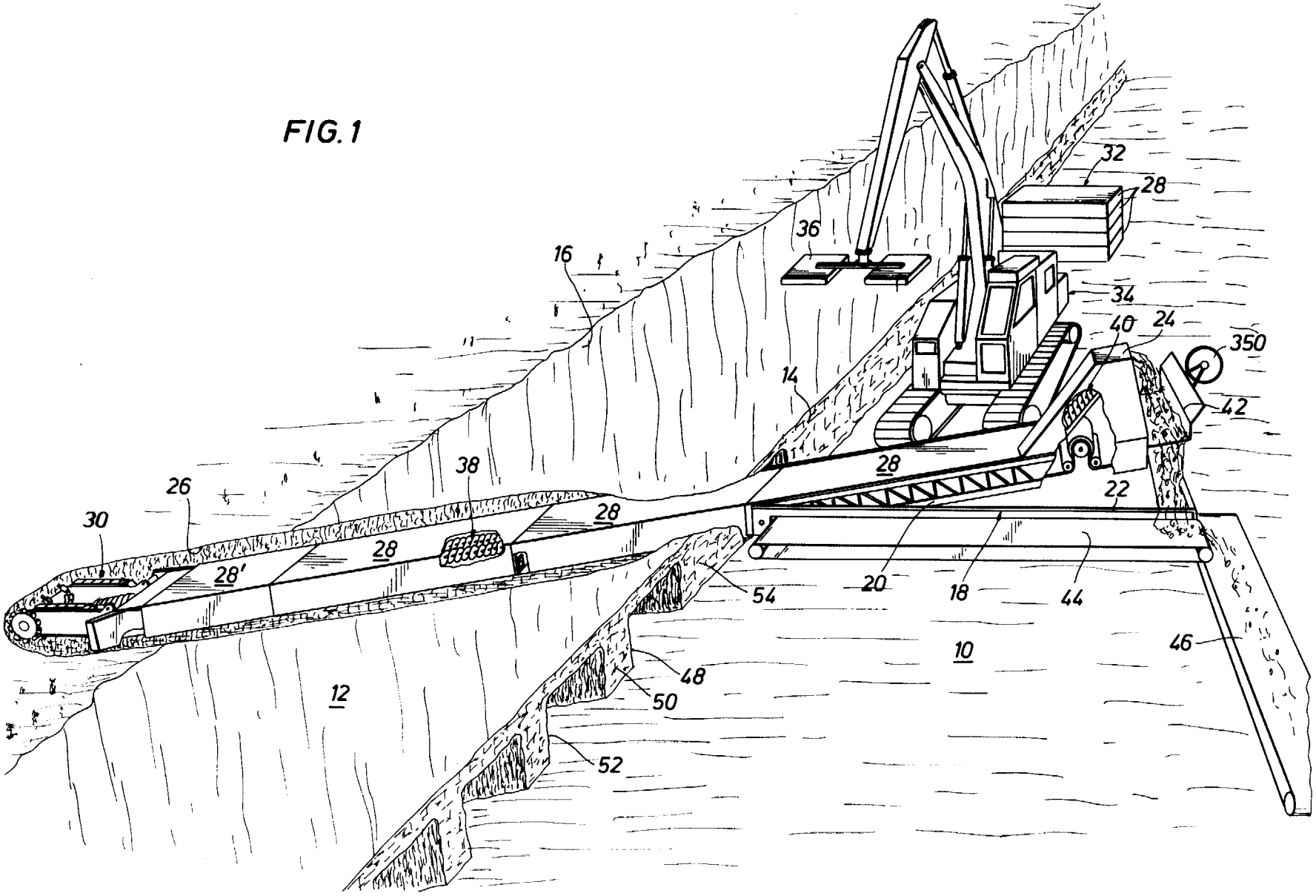
FIG. 1 is a diagrammatic perspective view of the mining apparatus of the invention in operation with parts broken away.

Referring to FIG. 1 there is shown a pit 10 which may have been formed by partial strip mining of the area being mined. Alternatively, the pit 10 may be formed specifically to provide a site for the mining apparatus of the invention. In any event, the excavation of the pit 10 exposes a wall 12. The wall 12 shows the stratification of the formation behind it, particularly revealing a lower thin seam of coal 14 and an upper layer of rock and/or soil 16. The mining machine includes a power head 18 located in the pit 10 facing the wall 12. The power head 18 includes a base frame 22 anchored to the floor of the pit 10, a track frame 20 vertically pivotally mounted on the base frame 22, and a drive assembly 24 mounted on the track frame 20 for longitudinal movement toward and away from the wall 12. Specific structural and operational details of the power head 18 as well as other parts of the mining machine will be described below, it being the intention at this point to generally describe the mining apparatus as a whole and its operation.

The machine is shown in the process of drilling a hole 26. Extending into this hole 26 from the power head 18 is a thrust-transmitting column comprising a plurality of column modules 28 and 28′ connected end-to-end. The forwardmost column module 28′ is connected to a cutting head 30. The cutting head 30 includes cutting means which break away the formation to form the hole as the cutting head is thrust forward by the power head 18 via the column modules 28′, 28. Specifically, the drive assembly 24 is connected to the rear end of the rearwardmost one of the column modules 28 shown on the track frame 20. As the drive assembly 24 moves forward on the track frame 20, the entire column with the cutting head is thrust forward until the rearwardmost column, connected directly to the drive assembly, is almost entirely within the hole 26. At this point, the drive assembly is detached from the rearwardmost column module and moved back to the rear of the track frame 20. A crane 34 then lifts another module 28 from a stack 32 in the pit by means of vacuum pads 36 and places it on the track frame between the column and the drive assembly. The drive assembly and the remainder of the column are then connected to this new module, now the rearwardmost one, and drilling begins again.

It should be noted here that the cutting head end of the machine will be considered the "front" end of the machine, while the power head end will be the "rear." Accordingly, a forward direction will be generally from the pit into the wall and a rearward direction will be from the wall toward the pit. Many coal seams are not truly horizontal. Thus, the machine will often operate at an angle. However, for convenience, the terms "horizontal" and "vertical" as used herein will be defined with respect to the machine itself as it would be disposed if operating truly horizontally.

A pair of parallel screw type conveyors 38 extend longitudinally through the column and seve to convey fragments cut from the formation by the cutting head 30 out of the hole 26. The conveyors are carried by the column in such a way that they are not subjected to and do not transmit any substantial part of the drilling thrust. When the fragments or cuttings reach the rear of the column, they are conveyed upwardy and rearwardly by screw type power head conveyors 40 in the drive assembly. From conveyors 40 the cuttings are dropped onto a belt conveyor 42 extending transversely across the back of the drive assembly. Conveyor 42 in turn drops the cuttings onto another endless belt conveyor 44 which carries them rearwardly to still another conveyor 46 by which they are loaded into trucks or suitable containers. It will be noted that the belt conveyor 44 extends along one side of the power head 18 so that it can catch the cuttings from conveyor 42 regardless of the position of the drive assembly 24 on the track frame 20.

Several generally parallel holes have been drilled in the coal 14. After the completion of each hole, the cutting head 30 is withdrawn from the hole by reversing the procedure used in drilling. In particular, the drive assembly 24 is moved rearwardly on the track frame 20 until the rearwardmost module can be removed. The drive assembly 24 is then moved forward, attached to the next module, and moved back again. The cutting head 30 is finally removed from the hole, by connecting it directly to the drive assembly 24. The machine is then moved a short distance to the right and a new hole is begun by thrusting the cutting head 30, which is still directly connected to the drive assembly, into the formation. Column modules can then be added one by one as the hole progresses.

A supporting pillar of formation is left between the old hole and the new hole. For example, after completion of hole 52, hole 48 was drilled leaving supporting pillar 50. Similarly, there is a supporting pillar 54 between hole 48 and the hole 26 shown in the process of being formed. In the embodiment shown, the machine always moves from left to right. Thus while each hole is being formed, there is a supporting pillar to its left and solid unmined formation to its right. The cutting head 30 is provided with means to cause the cutting head, while drilling, to bear to the right.

The forwardmost column module 28′ is modified to serve as a control module. It includes a side steering shoe laterally extensible and retractable from its right side. Thus, the front of the machine can be steered in the horizontal direction by pushing against the righthand wall of hole 26 to resist to varying degrees the tendency of the cutting head to bear to the right. It will be appreciated that the machine could be designed to move from right to left, in which case the cutting head would be designed to bear to the left, and the side steering shoe would be located on the left of control module 28′.

In addition to the side steering shoe, the control module 28′ includes bottom shoes for vertical steering, top control shoes for reaction to forces generated by the cutting head, and means for vertically pivoting or sweeping the cutting head with respect to the control module. The control module also contains sensing means which make the steering and sweeping needs known to the operator. These sensing and control devices are all connected, e.g. electronically or hydraulically, to a control station outside the hole. The control station might be located in the crane 34. The control station contains readout apparatus for the sensing means, switches or the like for operating the control and steering shoes and the sweep means, and means for operating the various motors, hydraulic rams, etc. on different parts of the machine.

Figure 2:
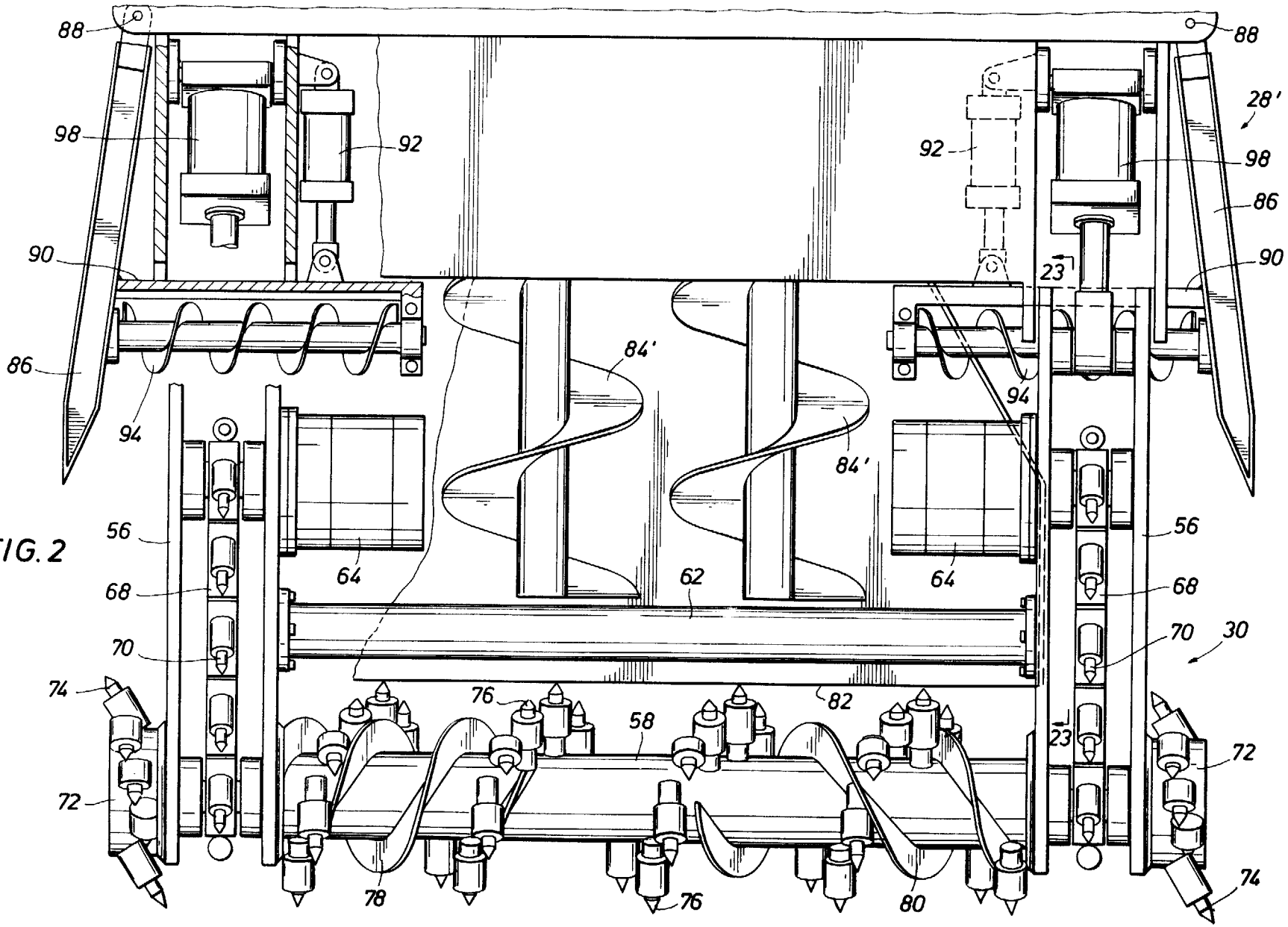
FIG. 2 is a top plan view of the cutting head and an adjacent portion of the control module with parts broken away.
Figure 3:
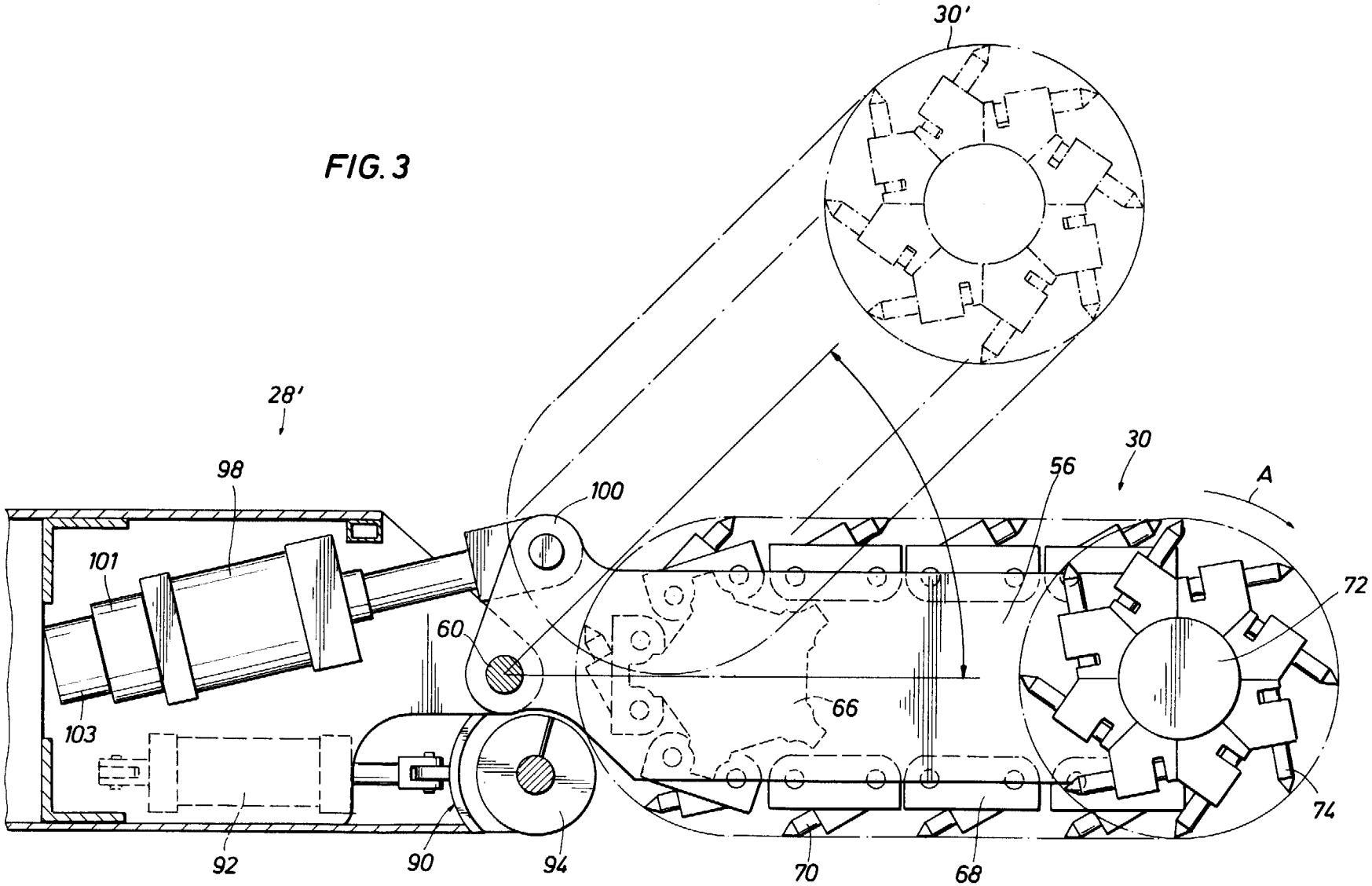
FIG. 3 is a side elevation of the cutting head and an adjacent portion of the control module with parts broken away and parts shown in section.
Figure 4:
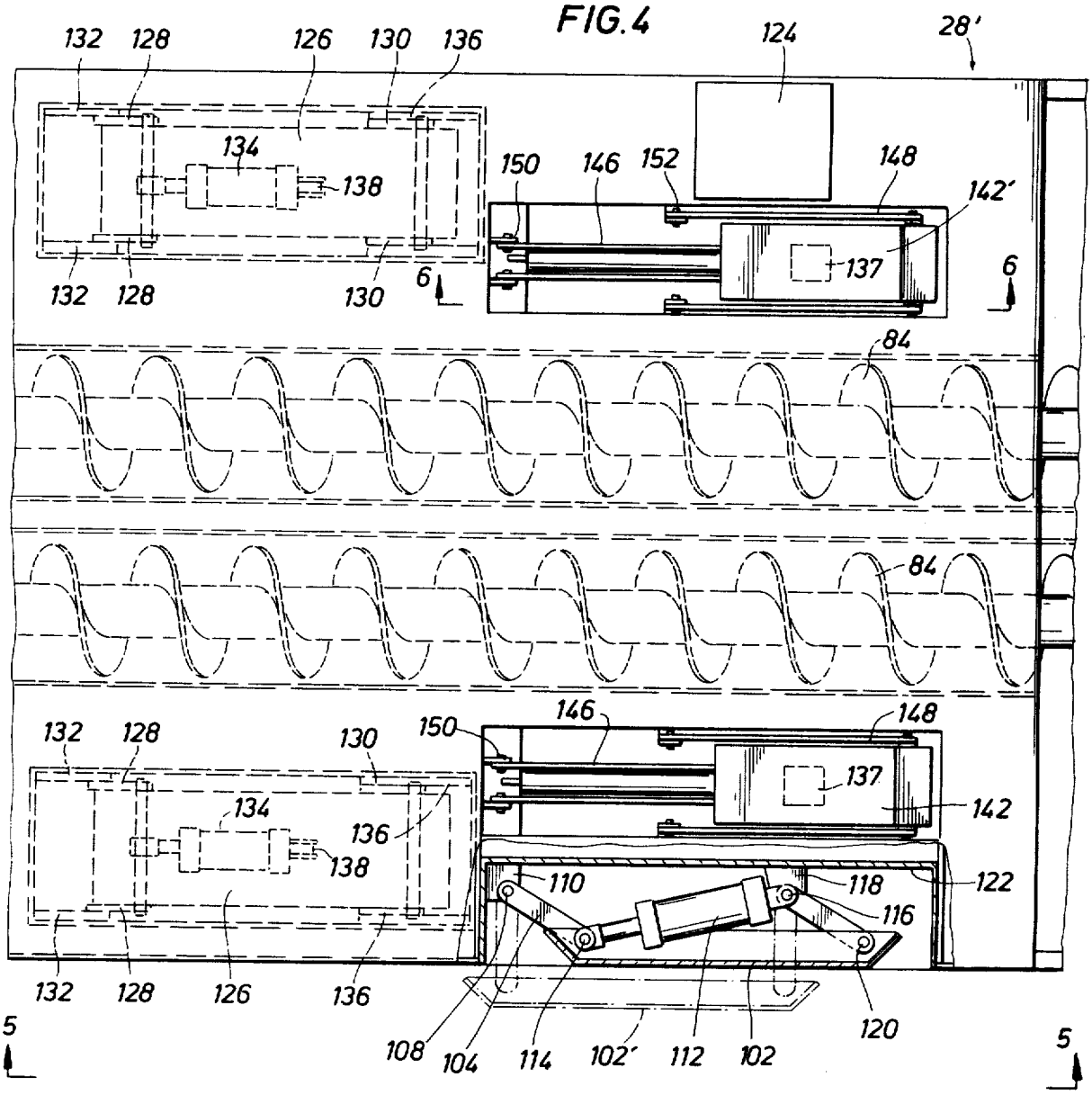
FIG. 4 is a top plan view of a portion of the control module showing the control and steering shoes.
Figure 5:
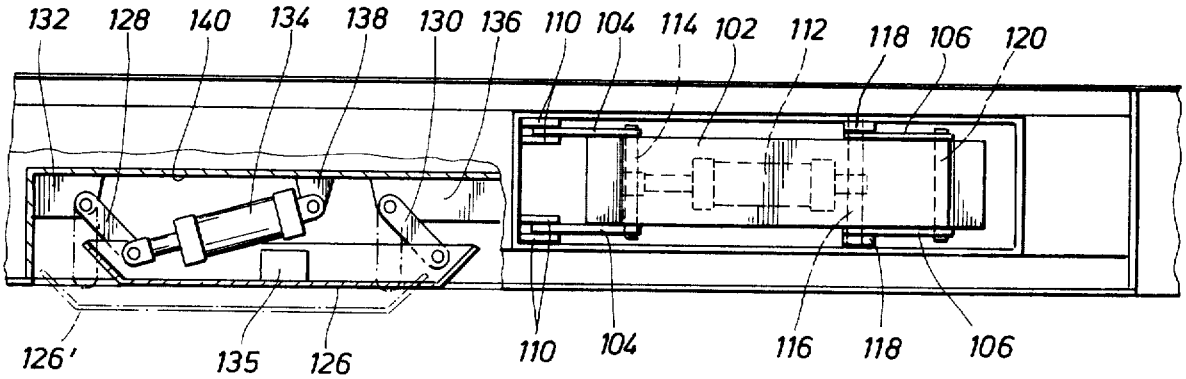
FIG. 5 is a side elevation on line 5—5 of FIG. 4 with parts broken away and parts shown in section.
Figure 8:
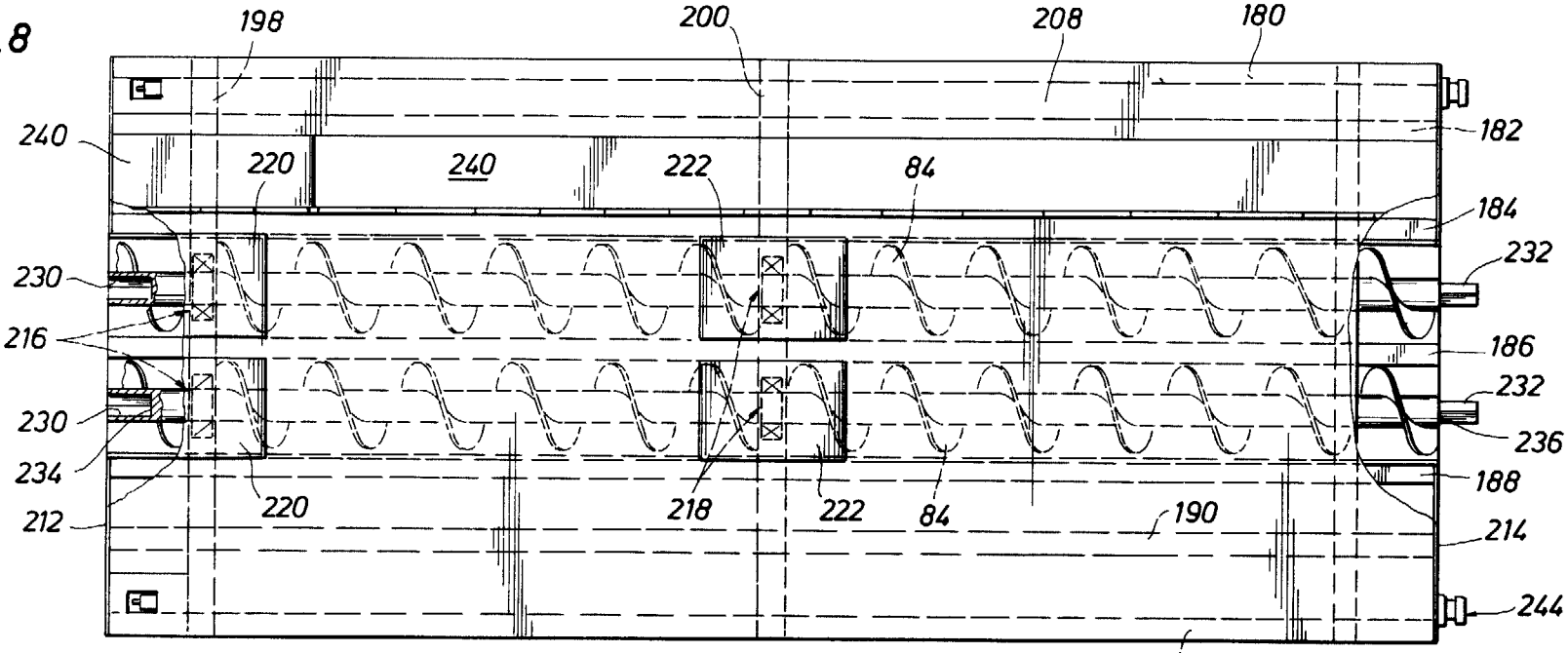
FIG. 8 is a top plan view of one of the column modules with parts broken away and parts shown in section.

Turning now to a more detailed description of the apparatus, FIGS. 2 and 3 show the cutting head 30 and the front portion of the control module 28'. The mid portion of control module 28' is shown in FIGS. 4 and 5. Cutting head 30 comprises a pair of spaced apart side bars 56. The bars 56 are joined at their front ends by a transverse shaft 58 mounted for rotation in the bars 56 by suitable bearings. The rear ends of bars 56 are pivotally connected to the front of the control module 28' by horizontal pins, one of which is shown at 60. Bars 56 are also connected by a transverse bracing rod 62 intermediate their front and rear ends. Mounted near the rear end of each bar 56 is a motor 64. Each motor 64 is operably connected to a sprocket wheel, one of which is shown at 66, rotatably mounted in the rear end of the respective bar 62. Each sprocket wheel 66 drives an endless chain 68 which extends around the periphery of the respective bar 62 in a vertical plane. Each of the chains 68 engages a respective sprocket (not shown) connected to the shaft 58 to rotate the latter.

A plurality of cutting picks 70 are rigidly mounted on each chain 62 and disposed at an angle to cut into the formation as the chain moves in the direction of the arrow A in FIG. 3. Thus the two chains together with their picks 70 form a first pair of cutting means. At each end of the shaft 58 is a cutting wheel 72, and each of these wheels 72 carries a plurality of picks 74 disposed at angles to cut into the formation when the shaft 58 rotates. Thus each wheel 72 with its picks 74 forms an additional outboard cutting means. A fifty cutting means, known as the center cutter, is formed by a plurality of picks 76 rigidly mounted on the shaft 58 and disposed at angles to cut into the formation as the shaft rotates. The picks 76 are arranged in a helical pattern, and the helix which they form is wound in a direction which cooperates with the direction of rotation of the shaft 58 to cause the cutting head in operation to bear toward a desired side. As mentioned above, the machine in the embodiment shown is designed so that the cutting head will bear toward its own right side (left side as viewed in FIG. 2). Accordingly, the picks 76 are arranged in the form of a right hand helix when viewed looking from the back toward the front of the machine (left hand helix as viewed in FIG. 2) for clockwise rotation of shaft 58 as viewed from the right side as in FIG. 3.

Also wound on the shaft 58 are a pair of helical conveyors 78 and 80. These are wound in opposite directions to direct the fragments cut by picks 76 toward the center of shaft 58. A scoop 82 (FIGS. 2 and 23) extends from the control module 28' forward along the floor of the hole being drilled and under the rear portion of the cutting head 30. The bottom of scoop 82 is pivoted to control module 28' by pins 83. The top of scoop 82 is connected to control module 28' by pins 85 riding in slots 87 so that scoop 82 has some vertical flexibility. The control module 30 carries a pair of parallel helical conveyor sections 84' whose front ends extend forward from the control module 28' over the scoop 82 and between the rear portions of the bars 56 of the cutting head 30. As the machine moves forward in the hole, the fragments cut by the picks 76 and conveyed toward the center of the shaft 58 by the conveyors 78 and 80 are scooped up by the scoop 82 as it scrapes along the floor of the hole. These cuttings are then conveyed rearwardly through the control module 28' by the conveyor segments 84'.

At each side of the front end of the control module 28' is a side scraper 86. Scrapers 86 are disposed generally longitudinally of the control module 28', but their rear ends are pivoted to the control module by pins 88 so that their front ends can be moved laterally in and out to follow the side walls of the hole being drilled. A bottom scraper 90 is rigidly connected to each of the side scrapers 86 near its front end and extends laterally inwardly therefrom. Inboard of each scraper 86 is a single acting hydraulic ram assembly 92 disposed generally longitudinally of the control module 28'. Each of the ram assemblies 92 has its cylinder pivoted to the main body of the control module and its piston pivoted to the respective bottom scraper 90, both connections being for horizontal pivoting. Thus the front ends of the scrapers 86 can be urged laterally outwardly against the formation by operation of the ram assemblies 92. Also mounted on the scrapers 90 are a pair of laterally extending helical conveyors 94 which, together with scrapers 90, extend into the scoop 82 through cut-outs 96 in its sides (see FIG. 23). The scrapers 86 and 90 serve to gather the fragments cut by picks 74 of the outboard wheels 72 and picks 70 of the chains 68 and direct them to the conveyors 94. Conveyors 94 in turn convey the cuttings into the scoop 82 from which they are carried rearwardly by the conveyor sections 84'. Note that the scraper 86 and scoop 82 have been broken away in FIG. 3 for clarity.

As mentioned above, the rear ends of the bars 56 of the cutting head are connected to the front of the main body of the control module 28 by horizontal pins 60 for vertical pivotal movement with respect to the control module. Each bar 56 has an upstanding ear 100 located generally above and slightly forward of the respective pin 60. On each side of the machine is a hydraulic sweep control ram assembly 98. Each of the ram assemblies 98 has its cylinder connected for vertical pivoting to the main body of the control module 28' and its piston connected to the respective ear 100 for vertical pivotal movement. Thus by retracting the ram assemblies 98, the front of the cutting head 30 can be swept or raised vertically as shown in phantom at 30' in FIG. 3 to mine an area of substantially greater vertical dimension that the cutting head itself. This allows the machine to extract maximum coal from seams of various thicknesses or from one seam whose thickness varies from place to place. Operatively connected to each ram assembly 98 are a servo valve 101 and a servo motor 103. The servo valve 101 and servo motor 103 are used to set the stroke of assembly 98 at a desired length to provide the proper amount of sweep for the cutting head 30. Valve 101 and motor 103 can also be used to cause the ram assembly 98 to automatically reciprocate in a cyclic manner.

It will be appreciated that the cutting head 30 is laterally elongated, i.e. its dimension from side to side is considerably greater than its vertical dimension. One of the main uses of the machine is in mining thin seams, and the vertical dimension of the cutting head is primarily determined by the thinnest seam area the machine will be expected to mine. The lateral dimension of the cutting head is primarily determined to allow a hole of maximum width to be drilled in a single pass while still leaving the pillars of formation between holes close enough to each other to provide adequate support.

Referring now to FIGS. 4 and 7 there is shown the mid portion of the control module 28'. For clarification in showing the various control and steering assemblies, various structural details of the control module, particularly its main body, have been omitted from these figures. At this point suffice it to say that the structure of the main body of the control module is similar to that of the other column modules 28, to be described hereinafter. The main body generally comprises a rigid box-like thrust-transmitting structure on which the other parts such as the conveyor sections 84', scoop 82, scrapers 86, various ram assemblies, etc., are mounted.

As shown in FIGS. 4 and 5, the control module has a side steering device on its right side (lower side as seen in FIG. 4). As mentioned above, this arrangement is for a machine in which the cutting head will bear to the right; the side steering device could be located on the left for a machine whose cutting head bears to the left. The side steering device comprises a side steering shoe 102. Shoe 102 is mounted on two pair of links 104 and 106 each having a laterally innermost stationary end and a laterally outermost swinging end. The stationary ends of the rear links 104 are connected by vertical pins 108 to plates 110 which are rigidly connected to the main body of the control module. The swinging ends of rear links 104 are pivotally connected to the rear end of shoe 102 and also to the end of the piston rod of a hydraulic double acting side steering ram assembly 112 by a vertical pin 114. The front links 106 have their stationary ends connected by vertical pins 116 to plates 118 which are rigidly connected to the main body of the control module. For convenience, the cylinder of the side steering ram assembly 112 is also connected to plates 118 by pin 116 although it could be pivoted to the main body of the control module by other means or in another location. The swinging ends of front links 106 are pivotally connected to the front end of shoe 102 by vertical pin 120. The swinging ends of all four links 104, 106 can swing rearwardly and laterally outwardly as shoe 102 moves out to the position shown in phantom at 102'. Phantom lines 102' represent the maximum extent of shoe 102 and the solid lines represent its fully retracted position in which the entire side steering device lies within a recess 122 in the main body of the control module. It will be appreciated that the shoe 102 could assume various positions between these two extremes. Shoe 102 is laterally extended and retracted from the right side of the control module by means of the side steering ram assembly 112 which is disposed at an angle to move the shoe 102 rearwardly and laterally outwardly when extended and forward and laterally inwardly when retracted. Meanwhile, the links 104 and 106 limit the travel of the shoe 102 and keep it parallel to the side of the control module regardless of its position. The shoe 102 is brought to bear against the right side wall of the hole being drilled to resist the tendency of the cutting head to bear to the right during operation. The front of the machine can then be steered in the horizontal direction by resisting the tendency of the cutting head to bear right to varying degrees.

On the left side of the machine directly opposite the side steering assembly is a sensing means illustrated diagrammatically at 124. Sensor 124 senses the presence of a supporting pillar of formation to the left of the hole being drilled (see 54 in FIG. 1). The sensor preferably also senses some factor indicative of the strength of the pillar, e.g. its actual strength, its thickness, or its mass. The presence or absence of this pillar and its strength makes the horizontal steering needs known to the operator of the machine who can then operate the side steering device accordingly. Generally he may strive to maintain a more or less uniform pillar thickness so that the hole will be generally parallel to the last hole drilled. Alternatively, the readings from sensor 124 may be electronically or otherwise transmitted directly to the controls for the side steering device to cause automatic steering. The sensor 124 can be any suitable type; for example, it might sense the adjacent pillar by transmitting ultrasonic waves and timing the echoes, or it might make similar use of microwaves, beams of nucleonic particles, laser beams, low frequency waves, etc. Still another possibility involves the use of a vibrator to strike the wall at a given frequency and means to measure the transmission of the vibrations through the formation. The readings from the sensor are transmitted to the machine operator at a control station outside the hole by any suitable means such as an electric circuit (not shown). A sensor such as 124 allows for continuous remote measurement of the pillar while the machine is drilling. However it will be appreciated that the pillar could be measured by a separate device such as a core guage which would be inserted in the hole alongside the machine while the drilling was stopped for emplacement of a new column module.

The control module also includes a pair of vertical steering devices disposed on opposite sides of the bottom of the control module. The vertical steering devices are very similar to the side steering device except that their shoes are vertically extensible and retractable from the bottom of the control module. Each of the vertical steering devices comprises a shoe 126 carried by a pair of rear links 128 and a pair of front links 130. The innermost ends of the links 128 and 130 are stationary and the outermost ends swinging. The stationary ends of the rear links 128 of each vertical device are connected to plates 132 by horizontal pins. Plates 132 are rigidly connected to the main body of the control module. The swinging ends of the rear links 128 of each vertical steering device are pivotally connected to the rear end of the shoe 126 and also to the piston rod of a hydraulic double acting vertical steering ram assembly 134 by a horizontal pin. The stationary and swinging ends of the front links 130 of each vertical steering device are respectively connected to plates 136 and the front ends of their shoe 126 by horizontal pins. Plates 136 are rigidly connected to the main body of the control module. Thus, as the shoes 126 are moved downwardly and rearwardly by their respective vertical steering ram assemblies 134, the swinging ends of the links 128 and 130 also move down and back in vertical planes to keep the shoes 126 parallel to the bottom of the control module. Because the links 128 and 130 are short, it is more practical to use a short ram assembly 134 having a short stroke. Accordingly, the cylinder of the assemblies 134 cannot be connected to plates 136 but are connected to respective ears 138 located between plates 132 and 136 on each vertical steering device and rigidly connected to the main body of the control module.

The solid lines in FIG. 5 show the fully retracted position of shoe 126 in which the entire vertical steering device is disposed within a recess 140 in the main body of the control module. The fully extended position of shoe 126 is shown in phantom at 126'. Shoe 126 is moved between these two positions by extending and retracting ram assembly 134. The operator of the machine can steer the front of the machine vertically by varying the positions of the shoes 126 as they ride on the bottom of the hole being drilled. He can also tilt the machine by extending one shoe 126 more than the other. Either or both of the shoes 126 may comprise a bottom sensor 135, similar to top sensors 137 to be described more fully below.

During operation, the cutting head 30 generates a high torque which may tend to lift the front of the machine off of the floor of the hole. To counteract this lifting, a pair of top control devices are provided on opposite sides of the top of the control module. Each of the top control devices comprises a top control shoe 142 which can be urged upwardly by a top control ram assembly 144 to ride against the ceiling of the hole. Either or both of the top control shoes 142' may have a top sensor 137 mounted thereon.

As best seen in FIGS. 6 and 7, the shoe 142 is carried by two pairs of links 146 and 148. Rear links 146 and front links 148 have their stationary ends connected to respective plates 150 and 152 by horizontal pins. Plates 150 and 152 are rigidly connected to the main body of the control module. Front links 148 have their swinging ends pivotally connected to the front end of the shoe 142 by a horizontal pin. Rear links 146 have their swinging ends pivotally connected to the rear end of shoe 142 by a horizontal pin. The piston rod of ram assembly 144 is connected to shoe 142 slightly below the connections of links 146 by a horizontal pin. The cylinder of assembly 144 is connected to an ear 154 rigidly connected to the main body of the control module.

As with the steering shoes described above, the links 146 and 148 limit the extent of shoe 142 and keep it parallel to the top of the control module as it is extended and retracted from the top of the control module by the ram assembly 144. FIG. 6 shows the shoe 142 in its fully retracted position in which the entire top control device is disposed within a recess 156 in the top of the main body of the control module. FIG. 7 shows the shoe 142 in its fully extended position riding against the ceiling 158 of the hole. As with the vertical steering shoes, top control shoes 142 can be independently operated to aid in or accommodate tilting of the machine.

Top and bottom sensors 137 and 135 are similar to the sensor 124. Sensors 137 may be operative to measure the thickness of a layer of coal 170 remaining at the top of the hole adjacent another stratum 172 of rock or the like. Sensors 137 might measure the thickness per se of layer 170, or they might determine other factors which indicate whether the cutting head is moving too close to the stratum 172 or not close enough. This allows a maximum amount of coal to be extracted from the seam without cutting into stratum 172 thereby causing waste and, if, stratum 172 is hard, damage to the cutting head. Bottom sensors 135 are preferably identical to top sensors 137 but detect the thickness of the layer of coal at the bottom of the hole (or other related factor).

Sensors 135, 137 may measure the thickness of the coal by producing ultrasonic waves, low frequency waves, microwaves, beams of nucleonic particles, laser beams, physical vibrations, etc. and measuring their transmission and/or reflection by the strata of coal and adjacent formation.

Another sensor embodiment is shown in FIG. 21. Referring to FIG. 21, the top control shoe 142' carries a rotatable blade 400. Blade 400 is urged upwardly by retraction of a small hydraulic cylinder assembly 402 via a linkage having two rigidly connected arms 404, 406 disposed at an angle to each other. A transducer 408 measures the movement of arm 406. If blade 400 is cutting only coal, it will be urged upwardly to its full extent by assembly 402. If layer 172 is harder rock and blade 400 begins to enter this layer, the blade will be forced downwardly and this movement detected by transducer 408.

Any of the top and bottom sensors may be used to make the vertical steering and sweep needs known to the machine operator, or they may be directly connected to the controls for the vertical steering devices and sweep control rams for automatic steering and sweep control.

Figure 9:
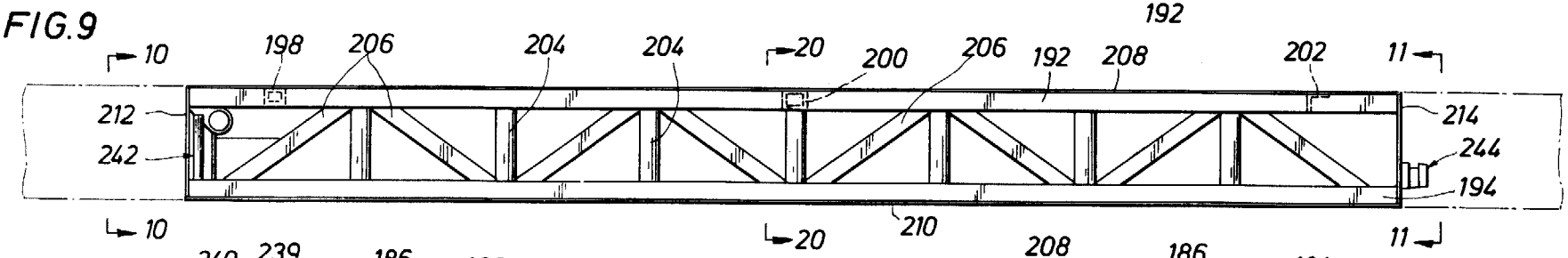
FIG. 9 is a side elevation of the module of FIG. 8.
Figure 11:
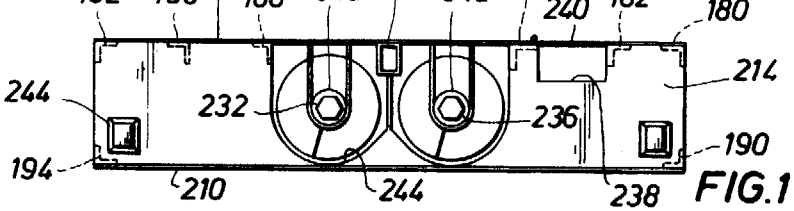
FIG. 11 is an end elevation on lines 11—11 in FIG. 9.
Figure 10:
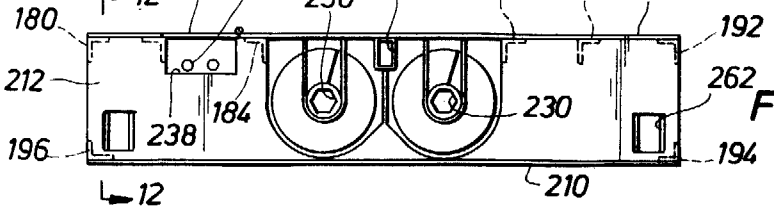
FIG. 10 is an end elevation on lines 10—10 in FIG. 9.
Figure 16:
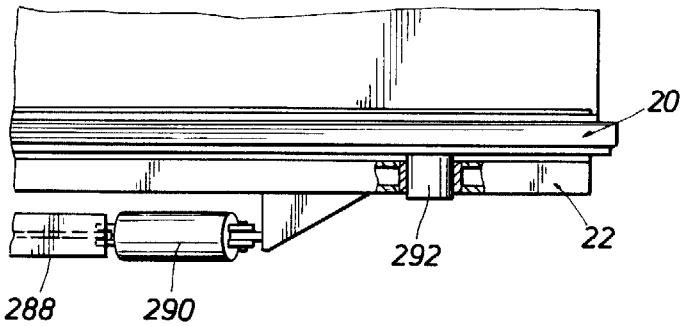
FIG. 16 is a top fragmentary plan view of a portion of the power head on lines 16—16 in FIG. 15 and with parts broken away and parts shown in section.
Figure 15:
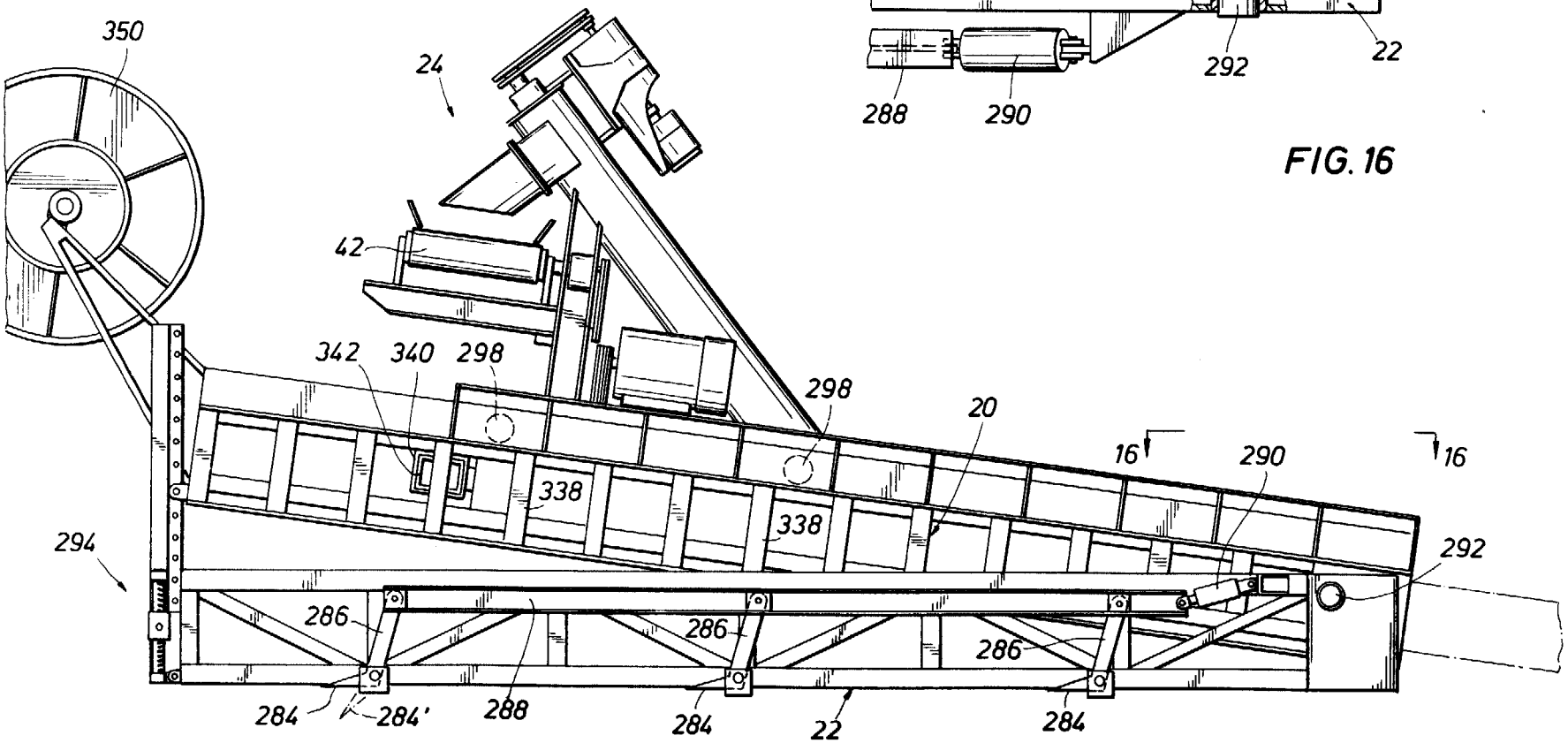
FIG. 15 is a side elevation of the power head.
Figure 17:
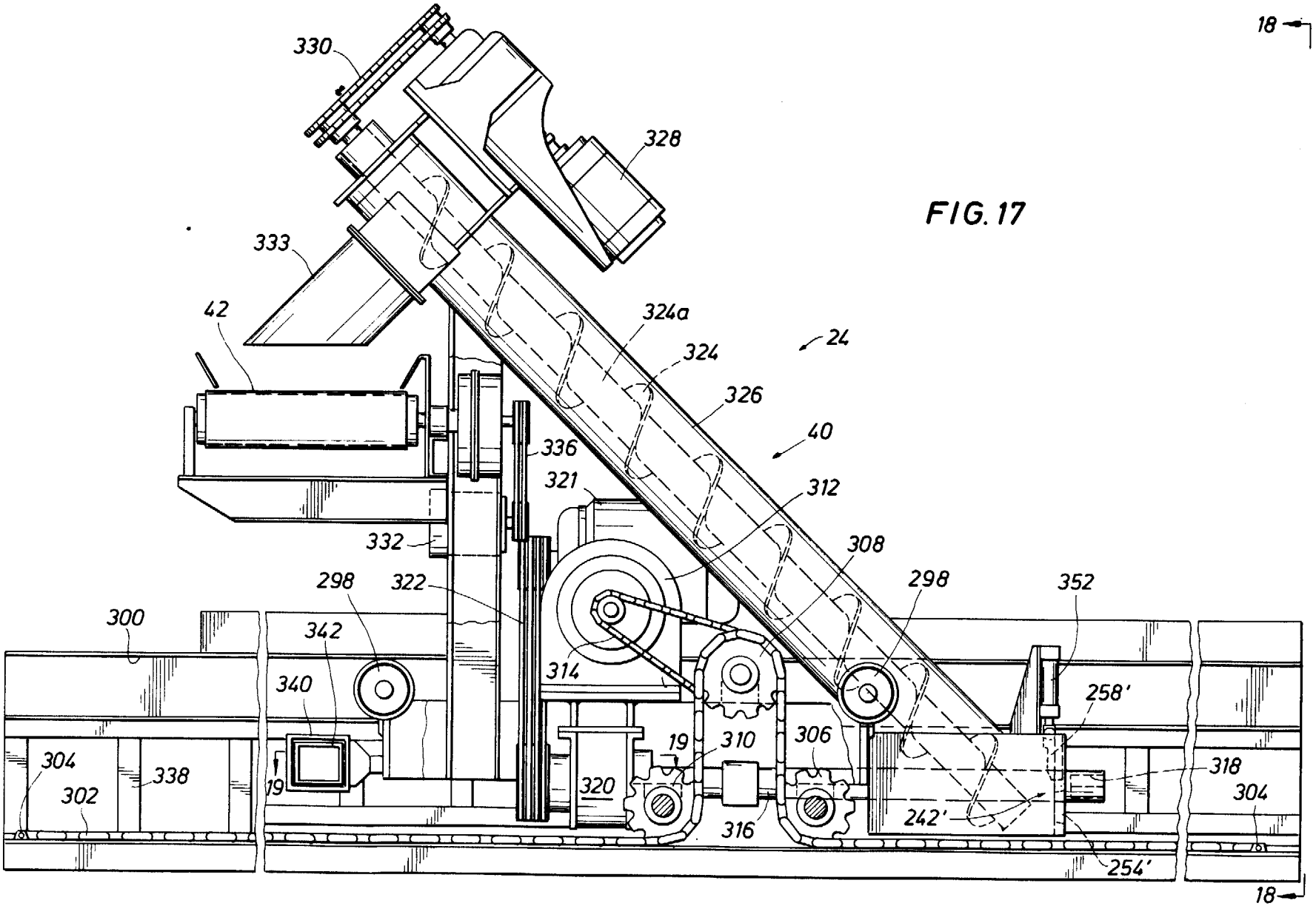
FIG. 17 is an enlarged side elevation of the power head with parts broken away.
Figure 18:
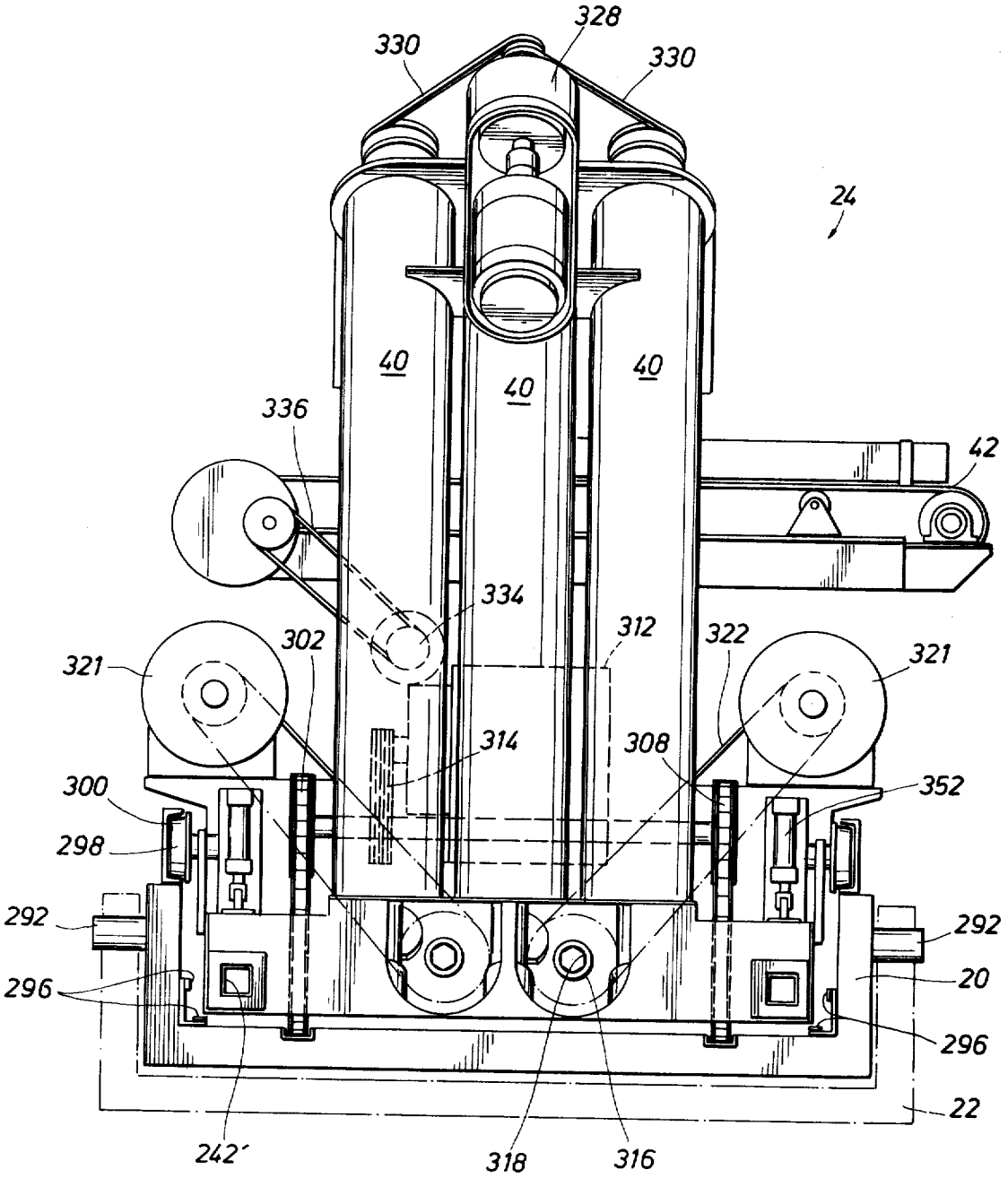
FIG. 18 is a front elevation of the power head on lines 18—18 of FIG. 17.

Turning now to FIGS. 8–11 there is shown one of the column modules 28. The main body of the module 28 is generally comprised of the non-moving parts of the module which are rigidly connected together. The main body includes a basic framework comprising longitudinal frame members 180–196 extending from end to end of the module and transverse frame members 198–202. The frame members are rigidly connected at their points of intersection by welding or in any other suitable manner. The longitudinal and transverse frame members may be mutually notched at their points of intersection to allow them to cross, or the transverse frame members 198–202 may each be made up of several segments, each segment being disposed between two adjacent longitudinal frame members and welded to their sides. As shown in FIG. 9, one side of the module includes a number of vertical truss members 204 and diagonal truss members 206 extending between and rigidly attached to longitudinal frame members 192 and 194 so that the side of the module forms a truss. The other side of the modules is identical; it includes vertical and diagonal truss members (not shown) extending between longitudinal frame members 180 and 196. Rigidly connected to the basic framework formed by the longitudinal frame members 180–196, transverse frame members 198–202, and truss members 204, 206 are a top cover 208, a bottom cover 210, and end covers 212 and 214.

It will thus be appreciated that the main body of the column module defines a generally box-like structure, particularly a rectangular parallelopiped. It should be understood that the term "box-like" is not intended to imply that all faces of the structure must be covered or that any one face must be completely covered. Rather, the term is used broadly to describe the general configuration of the main body of the module. The structure of the main body of the control module 28' is substantially the same as that of the other column modules 28, i.e. it is of similar shape and includes longitudinal and transverse frame members, side truss members, and top, bottom, and end covers all in approximately the same locations as those of the other column modules. The structure of the main body of the control module differs from that of the other modules primarily in that it includes additional frame members which define the recesses in which the steering devices and control devices are located. It will be noted that the control module 28' as well as the other column modules 28 are laterally elongated just as the cutting head 30 is laterally elongated. In particular, the lateral and vertical dimensions of the main bodies of the column modules 28, 28' are approximately the same as those of the cutting head 30 exclusive of its outboard cutting wheels 72.

Each of the column modules 28 carries a pair of parallel helical conveyor segments 84 extending along its length. When the column modules are joined end-to-end, the conveyor segments 84 are also joined to form two parallel column conveyors 38 (FIG. 1) extending along the length of the column. Each of the conveyor segments 84 has its shaft 84a rotatably mounted in longitudinally spaced pillow block bearings 216 and 218 mounted on transverse frame members 198 and 200 respectively. A respective pair of bolts 224 (see FIG. 20) secures the top and bottom portions of each of the bearings 218 to each other and also to transverse frame member 200. Each conveyor segment may be comprised of three subs having their shafts teliscopically threadedly connected at the bearings 216, 218 to allow assembly and disassembly. Openings 226 are provided in the top of transverse frame member 200 to allow access to the bolts 224. The front bearings 216 are similarly constructed and mounted. Access to the bearings in general is provided by doors 220 and 222 in the top cover 208.

The front end of the shaft 84a of each conveyor segment 84 stops at the front end cover 212 and is provided with a hexagonal box 230. The rear end of each shaft 84a is provided with a hexagonal pin 232 which extends beyond rear end cover 214. When the column modules 28 are connected, the pins 232 of the conveyors 84 in one module fit into the boxes 230 of the conveyors 84 in the next module to transmit torque all along the entire conveyor 38. It should be noted, however, that the drilling thrust is transmitted primarily by the main bodies of the column modules. Preferably, the end walls 234 of the boxes 230 and the bases 236 of the pins 232 are spaced inwardly from the ends of the main body sufficiently to prevent longitudinal abutment, and thus thrust transmission, between the conveyor segments 84.

A U-shaped trough 228 (FIG. 20) rigidly secured to appropriate ones of the frame members extends along the sides and bottom of each of the conveyor segments 84. The trough forms a part of the main body of the module and defines a conduit through which the conveyor segment can convey cuttings. The conveyor segments are disposed within the box-like structure defined by the main body of the module and are thus protected from physical injury during movement of the modules and drilling. The top cover 208 also protects the conveyor segments 84 from becoming jammed or damaged by debris which may fall from the ceiling of the hole.

The end covers 212 and 214 are cut away at 242 and 244 respectively to allow cuttings to pass from the troughs 228 of one module to those of the next module. Another trough 238 is provided in the module, running along its length to house hoses 239 which carry hydraulic fluid to the various hydraulic devices on the cutting head and control module. Electrical wiring, a water hose, and other apparatus may also be housed in trough 238. Access to the trough 238 is provided by doors 240 in the top cover 208.

The conveyor and bearing arrangement of the control module 28' is substantially identical to that of the other column modules 28 except that the front ends of its conveyor segments 84' extend beyond the front of its main body and do not include the hexagonal pins.

Each of the column modules 28 has a pair of laterally spaced female connection assemblies 242 (FIG. 12) at its front end and a pair of laterally spaced male connection assemblies 244 at its rear end. The connection assemblies comprise a modified form of the type of connection assemblies disclosed in U.S. Pat. No. 3,805,721. As best seen in FIGS. 12–14 the male connection assembly 244 comprises a pin 246 which is rigidly attached to the main body of the module 28 and extends outwardly from its end. Pin 246 has a head 250 at its free end, a base 252 at its attached end, and a groove 248 along its top and sides between the head 250 and base 252. The female connection assembly comprises a plate 254 rigidly mounted in the end portion of the main body of the module. Plate 254 has an aperture 256 for receipt of the pin 246, and the end cover 214 is cut away at 262 to expose this aperture. Behind plate 254, a hairpin locking member 258 is mounted for vertical sliding movement. The lower end of locking member 258 has a downwardly opening slot 260 sized to fit over the groove 248 in pin 246 (see FIG. 22).

FIGS. 12 and 14 show the locking member 258 in its raised position prior to connection of the two modules 28a and 28b. Locking member 258 extends up through an opening 264 in the top cover 208. Locking member 258 is held in this raised position by a counterweight 266 located inboard of the locking member 258. A pair of outer arms 268 and 269 extend from the counterweight 266 and are pivoted to the main body of the module 28a adjacent the locking member 258 by pins 270. A shorter arm 284 extends from counterweight 266 intermediate arms 268 and 269 and in the same direction as arms 268 and 269. Arms 268 and 284 lie immediately adjacent the sides of the locking member 258. Locking member 258 is raised to the position shown in FIG. 12 by reaching through the aperture 264 to engage a notch 282 in the locking member. As the locking member is pulled up through aperture 264, pegs 278 extending from the sides of locking member 258 inboard of the pivot pins 270 will engage notches 280 in the arms 268 and 284 raising the counterweight slightly. The tendency of the counterweight 266 to swing down and toward the end cover 214 then holds the locking member 258 in its upper position.

To connect the two modules 28a and 28b, they are moved toward each other until pin 246 has entered the aperture 256 as far as possible. The base 252 is thus aligned with plate 254, and the groove 248 is aligned with the slot 260. The top of locking member 258 is then struck with a hammer to force pegs 278 out of notches 280, and the locking member 258 falls down to the position shown in FIG. 13. The slot 260 fits over groove 248 snugly enough to prevent the head 250 and base 252 of the pin 246 from moving past locking member 258 if the members 28a and 28b tend to move toward or away from each other. It will be noted that the dimension of the groove 248 between head 250 and base 252 is slightly greater than the thickness of the lower part of locking member 258 containing slot 260. Furthermore, the parts of the connecting assemblies are sized so that there is a slight clearance between the pin 246 and the locking member 258 in the area of groove 248 and slot 260 and between the base 252 of the pin 246 and the edges of the aperture 256 in plate 254. This allows for a slight flexing movement between the modules 28a and 28b when they are not under a longitudinal compressive load. This flexing helps to prevent the connecting assemblies from becoming jammed with debris or frozen up by rust, corrosion or the like. The flexibility is also useful in preventing breakage of various parts of the equipment if the machine should be stuck in the hole and have to be forcefully removed.

Each of the modules 28 has a pair of female connection assemblies on its front end and a pair of male connection assemblies on its rear end. The drive assembly 24 of the power head 18 has female connection assemblies (to be described hereinafter) located at its front end for connecting the drive head to the rearwardmost one of the modules 28. The control module 28' has male connection assemblies only, located at its rear end, for connecting the control module 28' to the next module 28.

As mentioned above, the modules 28 are connected end-to-end to form a thrust-transmitting column. The term "column" is used to describe the group of connected modules even though it extends generally horizontally rather than vertically as its slenderness ratio must be such that it will provide enough strength to transmit the drilling thrust without significant bending, whipping, or the like. This allows the column not only to transmit thrust but to guide and control the cutting head. Guiding (or gross steering) is accomplished by disposing the rearwardmost module at a suitable angle. The rigid column maintains this general direction along its length. Fine steering adjustments are made by the above mentioned steering means on the control module. The factors and ratios involved are determinable by use of known engineering principles. The column-like characteristics of the group of connected modules are effected by several basic considerations including: the internal structural rigidity and compressive strength of the individual modules; the distribution of the thrust; and the extent of the area of abutment between adjacent modules when they are placed in compression by the drilling thrust.

The drilling thrust is borne primarily by the longitudinal frame members 180–196 of the column modules 28. These longitudinal frame members are distributed across the entire lateral and vertical extent of the module. In particular, there is a longitudinal frame member 180, 192, 194 or 196 disposed at each of the upper and lower side edges of each module. Thus the thrust is distributed over the entire transverse cross-sectional area of the module. This represents an area nearly as wide laterally as the cutting head, and thus, the hole itself. The difference between the lateral width of the modules and that of the hole (the latter being determined by the width of the cutting head including the outboard cutting wheels 72) is preferably just sufficient to allow for operation of the side steering device and to prevent the machine from becoming stuck or jammed in the hole. The width of the hole would probably not exceed that of the modules by more than 20% of the former in preferred embodiments. The vertical dimension of the cross-sectional area of the modules is preferably substantially the same as that of the cutting head which is in turn only slightly smaller than the minimum thickness of the mineable coal seam. In short, the thrust is preferably distributed over the greatest cross-sectional area practical.

The longitudinal frame members do not, however, act as independent thrust transmitting members as in the piror art. Rather they are incorporated in an integral, rigid main body which acts as a single thrust-transmitting column member. The main body of each module has sufficient lateral and vertical extent and sufficient internal rigidity to make it substantially inflexible under longitudinal thrust loads to which it will be subjected. It will also be noted that, just as the thrust is distributed over the full lateral and vertical extent of each module, the area of abutment between adjacent modules also covers this full cross-sectional area so that there is no tendency for flexing between adjacent modules when they are under compressive load, i.e. the drilling thrust (see FIG. 13). All of these factors contribute to the column-like characteristics of the modules.

Turning now to FIGS. 15–19 there is shown the power head 18 of the mining machine. The power head comprises a base frame 22 which rests on the ground outside the hole. The base frame can be anchored to the ground by a number of picks 284 which are pivotally mounted near the bottom of the base frame 22. Each pick 284 is rigidly connected to an upstanding link 286, and the links 286 on each side of the base frame 22 are all pivotally connected to a bar 288 which extends longitudinally along that side. A hydraulic ram assembly 290 interconnects the bar 288 and the base frame 22. Thus, by extending the ram assembly 290, the bar 288 is moved rearwardly. The links 284 and connected picks 286 are rotated about their pivotal connections to the base frame 22 to the position shown in phantom at 284' so that the picks 284 dig into the ground and anchor the base frame 22.

The power head 18 also comprises a track frame 20 which is mounted on the base frame 22. The front ends of the two frames are pivotally connected by horizontal pins 292 so that the rear end of the track frame 20 can be raised and lowered with respect to the base frame 22 by means of a turnbuckle assembly 294 interconnecting the rear ends of the two frames. This vertical pivotal movement enables the track frame to be used to guide the thrust-transmitting column at an angle which corresponds generally to the inclination of the coal seam while finer steering adjustments can be made by the control module as explained above.

The drive assembly 24 is mounted for longitudinal reciprocation along the track frame 20. The drive assembly 24 includes guide wheels 298 on both sides which ride in respective raceways 300 at the sides of the track frame 20. A pair of chains 302 extend longitudinally along the sides of the track frame 20. The ends of the chains 302 are anchored to the track frame 20 at points 304. Each of the chains 302 passes under an idler sprocket 306, over a drive sprocket 308 and under another idler sprocket 310, the respective sets of sprockets for the two chains 302 being mounted on opposite sides of the drive assembly 24. The drive sprockets 308 are rotated by a reversible motor 312 also carried by the drive assembly 24 via a chain 314 . Near the bottom of the front of the drive assembly 24 are a pair of female connection assemlies 242' for connecting the drive assembly 24 to the rearwardmost column module 28. The connection assemblies 242' are similar to the assemblies 242 of the column modules having plates 254' containing apertures and hairpin locking members 258'. They differ from the assemblies 242 on the column modules in that the locking members 258' are operated by hydraulic cylinder assemblies 352 rather than manually. The cylinder assemblies 352 also eliminate the need for the counterweight arrangements for holding the locking members in their raised positions. When the rear column module is connected to the drive assembly, it rests on tracks 296 on the track frame 20. Thus, when motor 312 is operated, the drive assembly 24 along with the entire column of modules 28–28' and the cutting head 30 are moved forwardly or rearwardly while the tracks 296 guide the column in the direction of inclination of the track frame 20.

The drive assembly also includes a pair of parallel longitudinal shafts 316 whose front ends have hexagonal boxes 318 for connection to the shafts 84a of the column conveyor segments 84 of the rear column module 28. The shafts 316 are driven by respective motors 321 via belts 322 and gear reducers 320 to rotate the entirety of each column conveyor, the torque being transmitted by the hexagonal connections between conveyor segments. The rear or outlet ends of the column conveyors are disposed adjacent the inlets of three screw type drive assembly conveyors 40. Each conveyor 40 includes a helical conveyor segment 324 having a shaft 324a and encased in a tube 326. The conveyors slant upwardly and rearwardly from the column conveyors. The shafts 324a are driven by a motor 328 via belts 330. The outlets of conveyors 40 communicate with chutes 333 which deposit the cuttings on the transverse belt conveyor 42 mounted on the drive assembly. Conveyor 42 is driven by motor 332 via belt 336. The cuttings are carried to one side of the power head by conveyor 42. A longitudinal belt conveyor 44 (see FIG. 1) runs along the side of the drive head 18 to catch the cuttings from transverse conveyor 42 regardless of the position of the drive assembly on the track frame. Conveyor 44 in turn carries the fragments or cuttings to the rear of the power head to conveyor 46 for loading.

In addition to the primary drive means comprising chains 302, sprockets 306–310, motor 312, and belt 314, the power head 18 includes auxiliary drive means which provide additional force to move the drive assembly 24 relative to the track frame 20 if the cutting head 30 or column of modules 28–28′ should become jammed in the hole. The auxiliary drive means comprise a pair of hydraulic ram assemblies 344, preferably reversible, disposed on opposite sides of the drive head. Each of the assemblies 344 has its cylinder 348 connected to the drive assembly. The piston rods 346 of the assemblies 344 are connected to each other by a transverse tube 340 which lies between and free of the sides of the track frame 20. A second tube 342 is slidably mounted in each end of tube 340. The track frame has along each side a number of vertical bars 338. When the auxiliary drive means is not in use, the tubes 342 are disposed wholly within the tube 340 free of the sides of the track frame 20 as shown in the lower half of FIG. 19. When it is desired to use the auxiliary drive means, the tubes 342 are gripped with a suitable tool and pulled laterally outwardly between respective pairs of the bars 338 as shown in the upper half of FIG. 19. The tube 342 will abut one of the bars 338 between which it lies (the rearwardmost one of the cutting head is to be pulled back; the forwardmost one if the cutting head is to be pushed forward) to fix the piston rods 346 with respect to the track frame 20 against motion toward the abutting bar 338. The ram assemblies 348 are then operated, either alone or with the primary drive means, to forceably move the cutting head.

All of the rotary motors and ram assemblies on the drive head, cutting head, and control module are preferably hydraulic and are operated by controls in a single control station outside the hole. This control station may be in the cab of the crane 34 and the controls are connected to the various hydraulic devices by any suitable means, many of which are known in the art. Hoses for the hydraulic fluid for these various assemblies are carried by two of four spools 350 (only one of which is shown) mounted on the rear of the track frame 20 and pass through the troughs 238 in the column modules 28. The other two spools 350 respectively carry a water hose, for a cooling spray for the cutting picks, and an electric cable; these also pass through troughs 238. Readings from the sensing means are also conveyed to the control station by electronic or other suitable means. It will be appreciated that power means other than hydraulic motors and ram assemblies could be used for the various operations of the parts of the mining machine. However it is preferably to have the controls for all the power means and the readouts from the sensors all located in a single station outside the hole.

It will be appreciated that many modifications of the above embodiments can be made without departing from the spirit of the invention. It is thus intended that the scope of the invention be limited only by the claims which follow.

I claim:

[1. A mining machine comprising:

a cutting head including means for cutting an earth formation, the dimension of said cutting head from side to side being substantially greater than its vertical dimension;

a thrust-transmitting column connected to said cutting head and extending rearwardly therefrom, the dimension of said column from side to side being substantially greater than its vertical dimension, and said column having a non-thrust-transmitting column conveyor carried thereby and extending along substantially the entire length of said column;

and a power head connected to said column rearwardly of said cutting head and operative to thrust said cutting head forward into an earth formation by means of said column.]

[2. A mining machine as recited in claim 1 wherein said column comprises a plurality of column modules removably connected in end-to-end relation, a forwardmost one of said column modules being removably connected to said cutting head and a rearwardmost one of said column modules being removably connected to said power head, and wherein said column conveyor comprises a plurality of conveyor segments disposed in end-to-end relation, each of said conveyor segments being carried by a respective one of said column modules.]

3. A mining machine as recited in claim [2] *43* wherein each of said column modules has a main body which generally defines a rectangular parallelopiped.

4. A mining machine as recited in claim [2] *43* wherein the main body of each of said column modules comprises a top cover, and wherein each of said conveyor segments is disposed beneath the top cover of its respective column module.

5. A mining machine as recited in claim 4 wherein the main body of each of said column modules defines a box-like structure and wherein each of said conveyor segments is disposed within the box-like structure of its respective column module.

6. A mining machine as recited in claim 5 wherein the main body of each of said column modules further comprises a bottom cover, two end covers, and a plurality of bracing members at each of its sides.

7. A mining machine according to claim 5 wherein said column conveyor is a screw type conveyor.

8. A mining machine as recited in claim 7 comprising two such column conveyors carried by said column extending along substantially the entire length of said column and disposed parallel to each other.

9. A mining machine as recited in claim 7 wherein each of said column modules further includes a trough extending along the sides and bottom of the respective one of said conveyor segments.

10. A mining machine as recited in claim [2] *43* wherein the forwardmost one of said column modules is a control module and includes means for steering said cutting head.

11. A mining machine as recited in claim 10 wherein said steering means includes a side steering shoe selectively laterally extensible and retractable from one side of said control module and wherein said cutting head includes means operative to cause said cutting head to bear laterally toward said one side.

12. A mining machine as recited in claim 11 wherein said cutting head comprises a lateral shaft, means for rotating said shaft and a helical center cutter wound to cause said cutting head to bear toward said one side when cutting.

13. A mining machine as recited in claim 11 wherein said control module includes means operative to detect the presence of a pillar of formation at the side of said control module opposite said one side.

14. A mining machine as recited in claim 13 wherein said means for detecting the presence of said pillar is also operative to detect a factor indicative of the strength of said pillar.

15. A mining machine as recited in claim 12 wherein said cutting head further comprises a pair of side cutters disposed at opposite sides of said center cutter laterally outwardly of said column modules, cutting head conveyor means for conveying formation fragments cut by said cutting means to said column conveyor, and scoop means for directing said formation fragments into said cutting head conveyor means.

16. A mining machine as recited in claim 10 wherein said steering means includes a bottom steering shoe selectively vertically extensible and retractable from the bottom of said control module.

17. A mining machine as recited in claim 16 further comprising means for pivoting said cutting head vertically with respect to said control module.

18. A mining machine as recited in claim 17 wherein said control module includes means operative to detect a factor indicative of the thickness of a stratum of formation above said control module.

19. A mining machine as recited in claim 16 wherein said steering means includes two such bottom steering shoes disposed adjacent opposite sides of said control module and independently vertically extensible and retractable from the bottom of said control module.

20. A mining machine as recited in claim 10 wherein said control module includes a top control shoe selectively vertically extensible and retractable from the top of said control module to bear against the formation above said control module for reaction to forces generated by said cutting head.

21. A mining machine as recited in claim 20 wherein said control module includes two such top control shoes independently selectively extensible and retractable from the top of said control module.

22. A mining machine as recited in claim [2] *43* wherein said power head comprises a track frame, a drive assembly mounted on said track frame and removably connected to the rearwardmost one of said column modules, and primary reversible drive means for moving said drive assembly longitudinally along said track frame.

23. A mining machine as recited in claim 22 wherein said track frame includes a chain extending lengthwise of said track frame and having its ends anchored to said track frame, and wherein said drive assembly includes a sprocket wheel engaging said chain and a reversible motor operatively connected to said sprocket wheel to rotate said sprocket wheel and thereby move said drive assembly along said chain.

24. A mining machine as recited in claim 22 wherein said power head further comprises auxiliary drive means for moving said drive assembly longitudinally along said track frame.

25. A mining machine as recited in claim 24 wherein said auxiliary drive means includes a hydraulic ram assembly including a pair of telescoping members, one of said members being connected to said drive assembly, and means for selectively fixing the other of said telescoping members against motion in one direction with respect to said track frame.

26. A mining machine as recited in claim 22 wherein said power head further comprises power head conveyor means for conveying formation fragments from said column conveyor to the rear end of said power head.

27. A mining machine as recited in claim 22 wherein said track frame comprises guide means for guiding said column is the general longitudinal direction of said track frame.

28. A mining machine as recited in claim 27 wherein said power head further comprises a base frame, said track frame being pivotally mounted on said base frame, and means for selectively vertically pivoting the rear end of said track frame with respect to said base frame.

29. A mining machine as recited in claim 28 wherein said power head further comprises means for anchoring said base frame to the ground.

*30. A mining machine for mining mineral formations comprising:*

*a cutting head including means for cutting a mineral formation, the dimensions of said cutting head from side-to-side being substantially greater than its vertical dimension,*

*a power head disposed remote from said cutting head,*

*a thrust transmitting column disposed intermediate said cutting head and said power head, said thrust transmitting column being nonrotatable about its longitudinal axis and comprising a plurality of reusable column modules removably connected in end-to-end engagement, a forwardmost one of said column modules being removably connected to said cutting head and a rearwardmost one of said column modules being removably connected to said power head, each of said column modules comprising a box-like structure having a substantially greater dimension from side-to-side than vertically and being effective to transmit thrust as a unitary member, said plurality of column modules collectively functioning as a single thrust transmitting column member,*

*a column conveyor section disposed within the box-like section of, and carried by, each said column modules,*

*first means releasably securing adjacent column modules in thrust transmitting engagement,*

*said column conveyor sections being non-thrust transmitting,*

*said power head being effective to selectively apply forward or rearward force to the rearwardmost column module of said thrust transmitting column to selectively urge said cutting head forwardly into said mineral seam to facilitate cutting said mineral seam, or rearwardly thereof to facilitate removal of said cutting head and column from said mineral formation.*

*31. The mining machine of claim 30 in which said column modules are in abutment over a substantial portion of the cross-sectional area thereof.*

*32. The mining machine of claim 30 in which each said column module comprises a top cover and each of said conveyor segments is disposed beneath the top cover of its respective module.*

*33. The mining machine of claim 30 in which each said column module is substantially as wide as said cutting head.*

*34. The mining machine of claim 30 in which each said column module is substantially as high as said cutting head.*

*35. The mining machine of claim 30 in which each said column module is substantially as wide and as high as said cutting head.*

*36. The mining machine of claim 30 in which said cutting head means for cutting a mineral formation is carried by a control module and includes motor means carried by said control module.*

*37. The mining machine of claim 30 further including means for pivoting said cutting head vertically.*

*38. The mining machine of claim 30 in which said conveyor sections are screw conveyor sections.*

*39. The mining machine of claim 30 further comprising second means releasably interconnecting conveyors of adjacent column modules, said second means being effective to transmit a drive force for said conveyors, but not being effective to transmit thrust.*

*40. The mining machine of claim 39 wherein said power head comprises a track frame, a drive assembly mounted on said track frame and removably connected to the rearwardmost one of said column modules, and reversible drive means for moving said drive assembly longitudinally along said track frame, said drive assembly including means for driving said conveyor to the adjacent column module without applying substantial thrust thereto.*

*41. The mining machine of claim 30 wherein said power head includes means to selectively vertically tilt said column module.*

*42. A mining machine comprising:*

*a cutting head including means for cutting an earth formation, the dimension of said cutting head from side to side being substantially greater than its vertical dimension;*

*a nonrotatable thrust-transmitting column connected to said cutting head and extending rearwardly therefrom, the dimension of said column from side to side being substantially greater than its vertical dimension, and said column having a non-thrust-transmitting column conveyor carried thereby and movable relative thereto and extending along substantially the entire length of said column;*

*and a power head connected to said column rearwardly of said cutting head and operative to thrust said cutting head forward into an earth formation by means of said column, and to withdraw said cutting head and column from said earth formation.*

*43. A mining machine comprising:*

*a cutting head including means for cutting an earth formation, the dimension of said cutting head from side to side being substantially greater than its vertical dimension;*

*a thrust-transmitting column connected to said cutting head and extending rearwardly therefrom, the dimension of said column from side to side being substantially greater than its vertical dimension, and said column having a non-thrust-transmitting column conveyor carried thereby and extending along substantially the entire length of said column;*

*said column comprising a plurality of column modules removably connected in end-to-end relation, a forwardmost one of said column modules being removably connected to said cutting head and a rearwardmost one of said column modules being removably connected to said power head, said column conveyor comprising a plurality of conveyor segments disposed in end-to-end relation, each of said conveyor segments being carried by a respective one of said column modules,*

*and a power head connected to said column rearwardly of said cutting head and operative to thrust said cutting head forward into an earth formation by means of said column.*

* * * * *